US009981389B2

(12) United States Patent
Kennedy et al.

(10) Patent No.: US 9,981,389 B2
(45) Date of Patent: May 29, 2018

(54) ROBOTICS PLATFORMS INCORPORATING MANIPULATORS HAVING COMMON JOINT DESIGNS

(71) Applicant: California Institute of Technology, Pasadena, CA (US)

(72) Inventors: Brett A. Kennedy, Pasadena, CA (US); Matthew A. Frost, Pasadena, CA (US); John M. Leichty, Pasadena, CA (US); Michael J. Hagman, Pasadena, CA (US); James W. Borders, Pasadena, CA (US); Jamie S. Piacentine, Pasadena, CA (US); Charles F. Bergh, Pasadena, CA (US); Allen R. Sirota, Pasadena, CA (US); Kalind C. Carpenter, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days. days.

(21) Appl. No.: 14/637,278

(22) Filed: Mar. 3, 2015

(65) Prior Publication Data
US 2016/0008988 A1 Jan. 14, 2016

Related U.S. Application Data

(60) Provisional application No. 61/947,220, filed on Mar. 3, 2014, provisional application No. 62/060,158, filed (Continued)

(51) Int. Cl.
*B25J 9/06* (2006.01)
*B25J 15/08* (2006.01)
*B62D 57/032* (2006.01)

(52) U.S. Cl.
CPC ............. *B25J 15/08* (2013.01); *B25J 9/06* (2013.01); *B62D 57/032* (2013.01); *Y10S 901/28* (2013.01); *Y10S 901/31* (2013.01)

(58) Field of Classification Search
CPC .... Y10S 901/01; Y10S 901/14; Y10S 901/15; Y10S 901/28–901/31; B25J 9/06; B25J 15/028; B62D 57/032
See application file for complete search history.

(56) References Cited

U.S. PATENT DOCUMENTS 4,858,979 A * 8/1989 Parma ................. B25J 15/0266
294/106
7,348,747 B1 3/2008 Theobold et al.
(Continued)

OTHER PUBLICATIONS

"Bear Robot", Vecna Technologies, Inc., Dec. 9, 2013, Retrieved from https://web.archive.org/web/20140131193946/http://www.vecna.com/research on Jul. 8, 2014, 9 pages.
(Continued)

*Primary Examiner* — Anna M Momper
*Assistant Examiner* — Ronald P Jarrett
(74) *Attorney, Agent, or Firm* — KPPB LLP

(57) ABSTRACT

Manipulators in accordance with various embodiments of the invention can be utilized to implement statically stable robots capable of both dexterous manipulation and versatile mobility. Manipulators in accordance with one embodiment of the invention include: an azimuth actuator; three elbow joints that each include two actuators that are offset to allow greater than 360 degree rotation of each joint; a first connecting structure that connects the azimuth actuator and a first of the three elbow joints; a second connecting structure that connects the first elbow joint and a second of the three elbow joints; a third connecting structure that connects the second elbow joint to a third of the three elbow joints; and
(Continued)

an end-effector interface connected to the third of the three elbow joints.

21 Claims, 19 Drawing Sheets

Related U.S. Application Data on Oct. 6, 2014, provisional application No. 62/080,040, filed on Nov. 14, 2014.

(56) References Cited

U.S. PATENT DOCUMENTS

| | | | |
|---|---|---|---|
| 2004/0238068 A1* | 12/2004 | Duval | A01G 23/097 144/24.13 |
| 2005/0125100 A1 | 6/2005 | Stoddard et al. | |
| 2007/0284512 A1* | 12/2007 | Tanabe | G01L 5/166 250/208.6 |
| 2008/0179115 A1 | 7/2008 | Ohm et al. | |
| 2009/0314554 A1 | 12/2009 | Couture et al. | |
| 2010/0263948 A1 | 10/2010 | Couture et al. | |
| 2013/0105233 A1 | 5/2013 | Couture et al. | |
| 2013/0340560 A1* | 12/2013 | Burridge | B25J 17/00 74/490.05 |
| 2016/0023352 A1 | 1/2016 | Kennedy et al. | |

OTHER PUBLICATIONS

"Dual Arm", HDT Global, Jul. 1, 2015, Retrieved from https://web.archive.org/web/20150701083939/http://www.hdtglobal.com/product/dual-arm/ on Jul. 1, 2015, 4 pages.

Backes, "Dual-arm supervisory and shared control task description and execution", Robotics and Autonomous Systems, vol. 12, Issues 1-2, Mar. 1994, pp. 29-54.

Bajracharya et al., "Real-time 3d stereo mapping in complex dynamic environments", In International Conference on Robotics and Automation—Semantic Mapping, Perception, and Exploration (SPME) Workshop, 2012, Shanghai, China, 8 pages.

Birkenkampf et al., "A Knowledge-Driven Shared Autonomy Human-Robot Interface for Tablet Computers", in Proc. of the 2014 IEEE/RAS International Conference on Humanoid Robots (Humanoids), Madrid, Spain, Nov. 2014, pp. 152-159.

Gennery, Donald B. et al., "Generalized Camera Calibration Including Fish-Eye Lenses", International Journal of Computer Vision, vol. 68, Issue 3, Jul. 2006, pp. 239-266.

Hudson, Nicolas et al., "Model-based autonomous system for performing dexterous, human-level manipulation tasks", Autonomous Robots, vol. 36 (1-2), Feb. 10, 2014, ISSN 0929-5593, pp. 31-49.

Hudson et al., "End-to-end dexterous manipulation with deliberate interactive estimation", 2012 IEEE International Conference on Robotics and Automation, May 14-18, 2012, Saint Paul, MN, USA, pp. 2371-2378.

Ju et al., "Dual contouring of hermite data", ACM Transactions on Graphics, vol. 21, Issue 3, Jul. 2002, pp. 339-346.

Kalakrishnan et al., "Learning objective functions for manipulation", 2013 IEEE International Conference on Robotics and Automation, May 6-10, 2013, Karlsruhe, Germany, pp. 1331-1336.

Kuffner et al., "RRT-connect: An efficient approach to single-query path planning", Proceedings 2000 ICRA, Millennium Conference, IEEE International Conference on Robotics and Automation. Symposia Proceedings (Cat. No 00CH37065), vol. 2, Apr. 24-28, 2000, San Francisco, CA, USA, pp. 995-1001.

Leidner et al., "Object-Centered Hybrid Reasoning for Whole-Body Mobile Manipulation", 2014 IEEE International Conference on Robotics and Automation (ICRA), May 31-Jun. 7, 2014, Hong Kong, China, pp. 1828-183.

Lorensen et al., "Marching cubes: A high resolution 3D surface construction algorithm", ACM SIGGRAPH Computer Graphics, vol. 21, Issue 4, Jul. 1987, pp. 163-169.

Pastor et al., "Skill learning and task outcome prediction for manipulation", 2011 IEEE International Conference on Robotics and Automation, May 9-13, 2011, Shanghai, China, pp. 3828-3834.

Poston et al., "Multiresolution Isosurface Extraction with Adaptive Skeleton Climbing", Computer Graphics Forum, vol. 17, Issue 3, Sep. 1998, pp. 137-147.

Wimbock et al., "Experimental Study on Dynamic Reaction less Motions with DLR's Humanoid Robot Justin", The 2009 IEEE/RSJ International Conference on Intelligent Robots and Systems, Oct. 11-15, 2009, St. Louis, USA, 6 pgs.

Zhang et al., "A Unified Quadratic-Programming-Based Dynamical System Approach to Joint Torque Optimization of Physically Constrained Redundant Manipulators", IEEE Transactions on Systems, Man, and Cybernetics—Part B: Cybernetics, vol. 34, No. 5, Oct. 2004, pp. 2126-2132.

\* cited by examiner

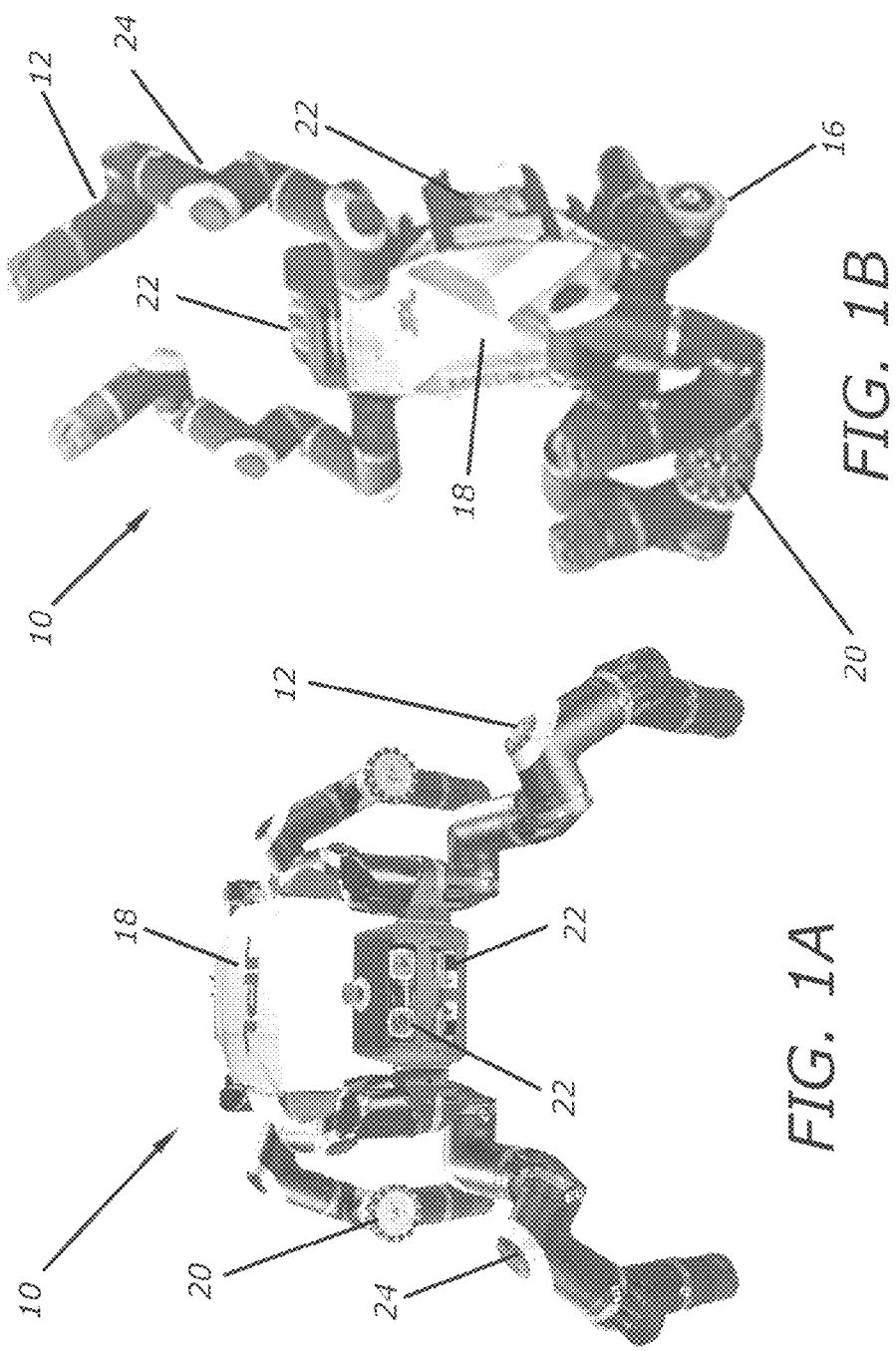

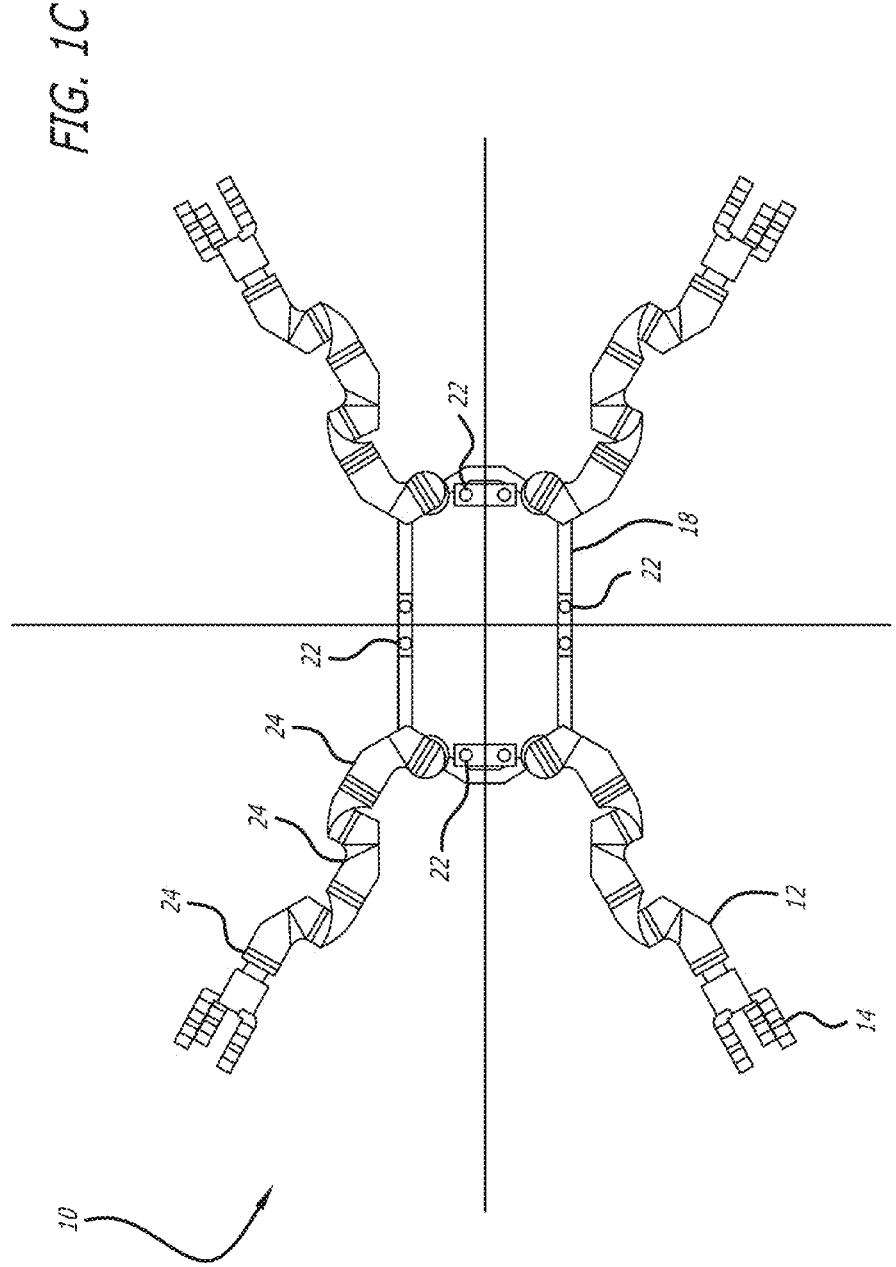

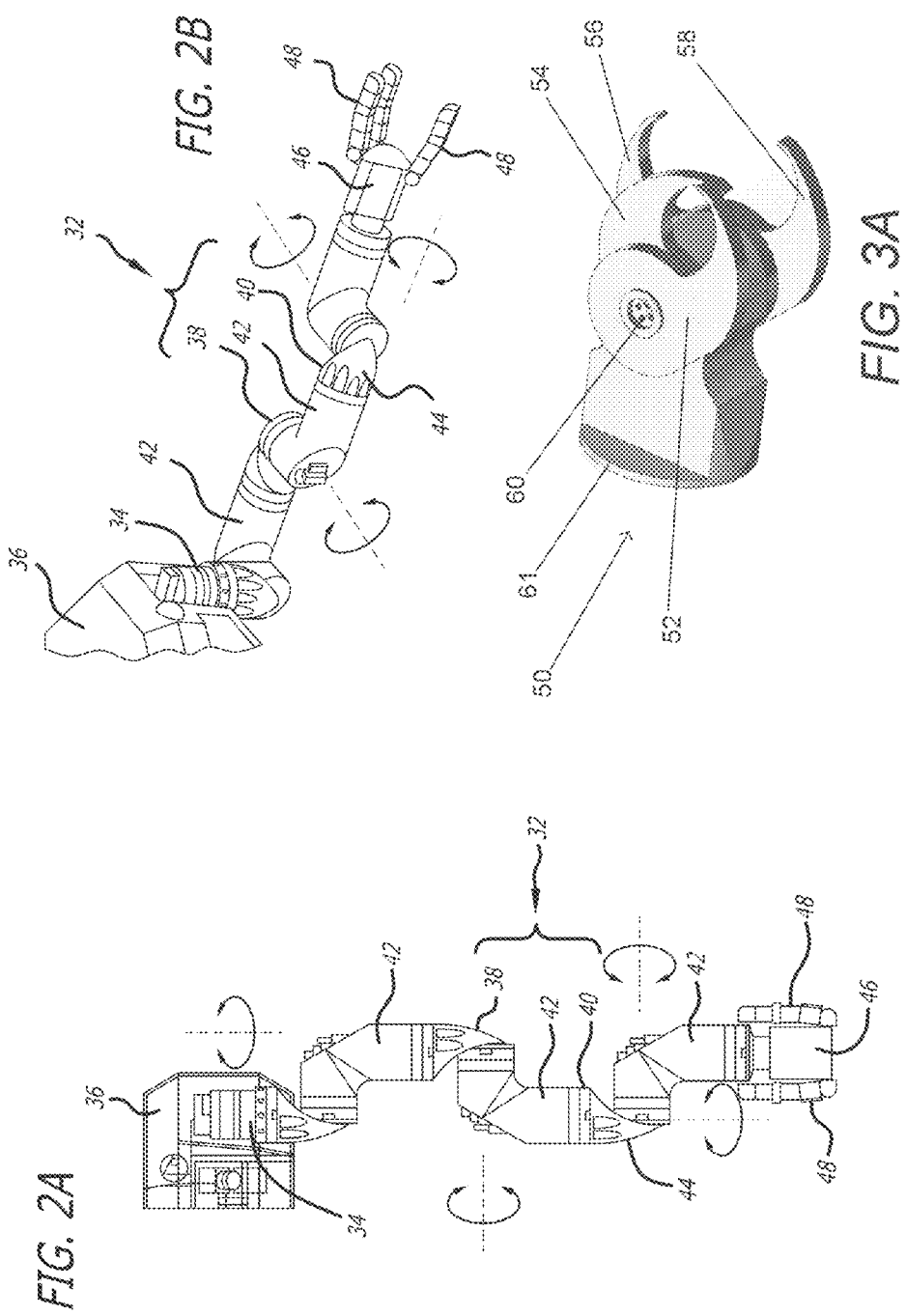

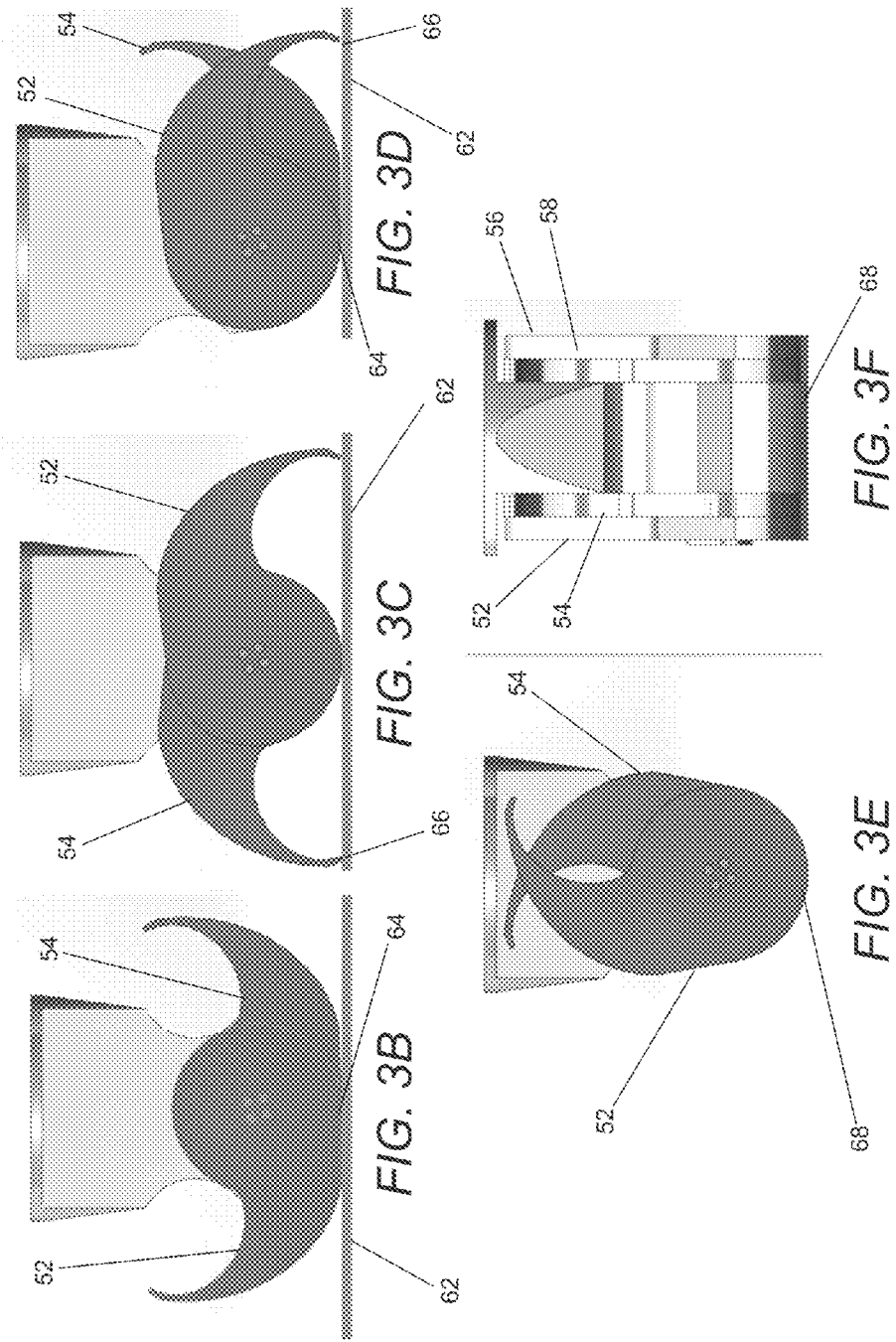

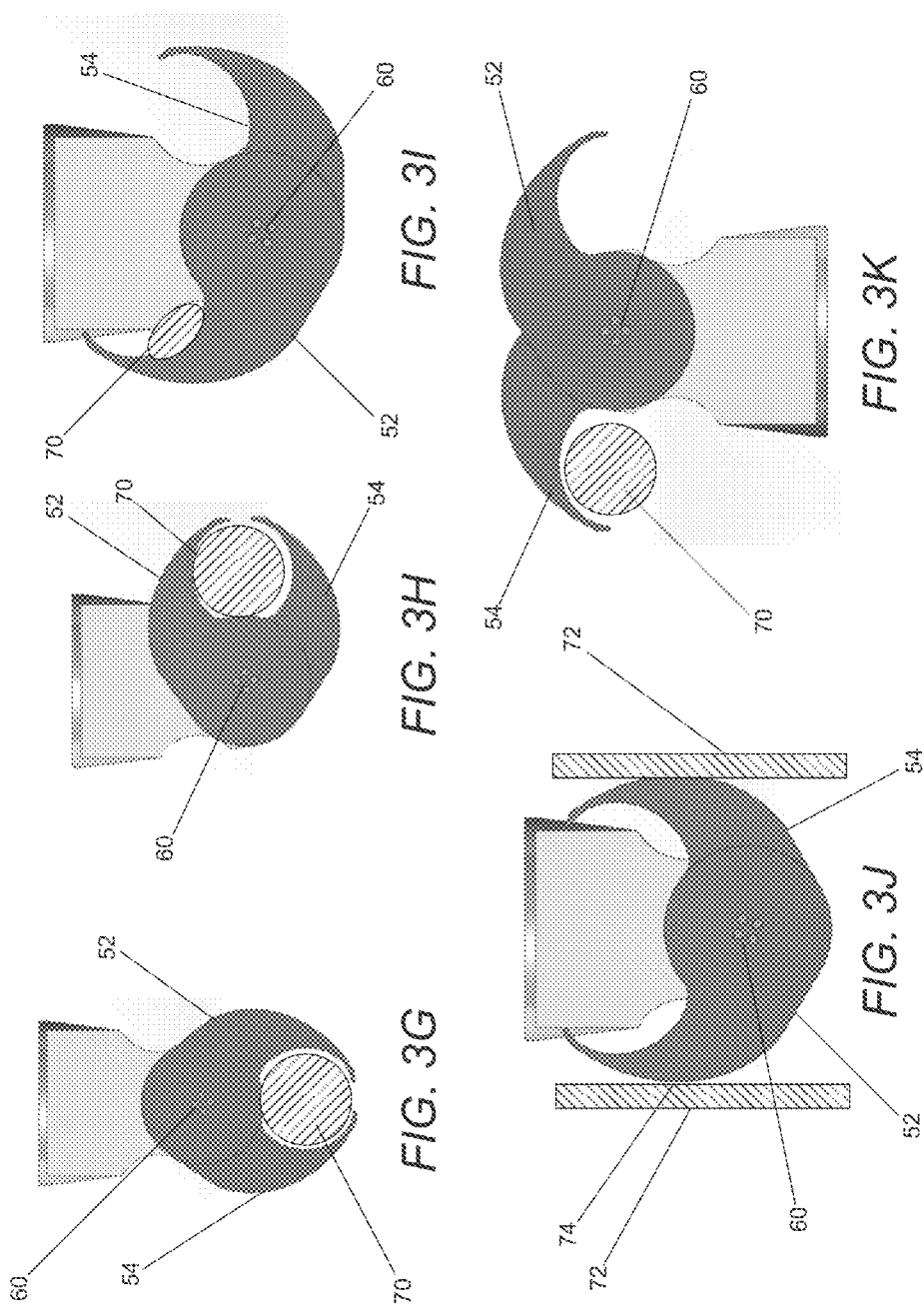

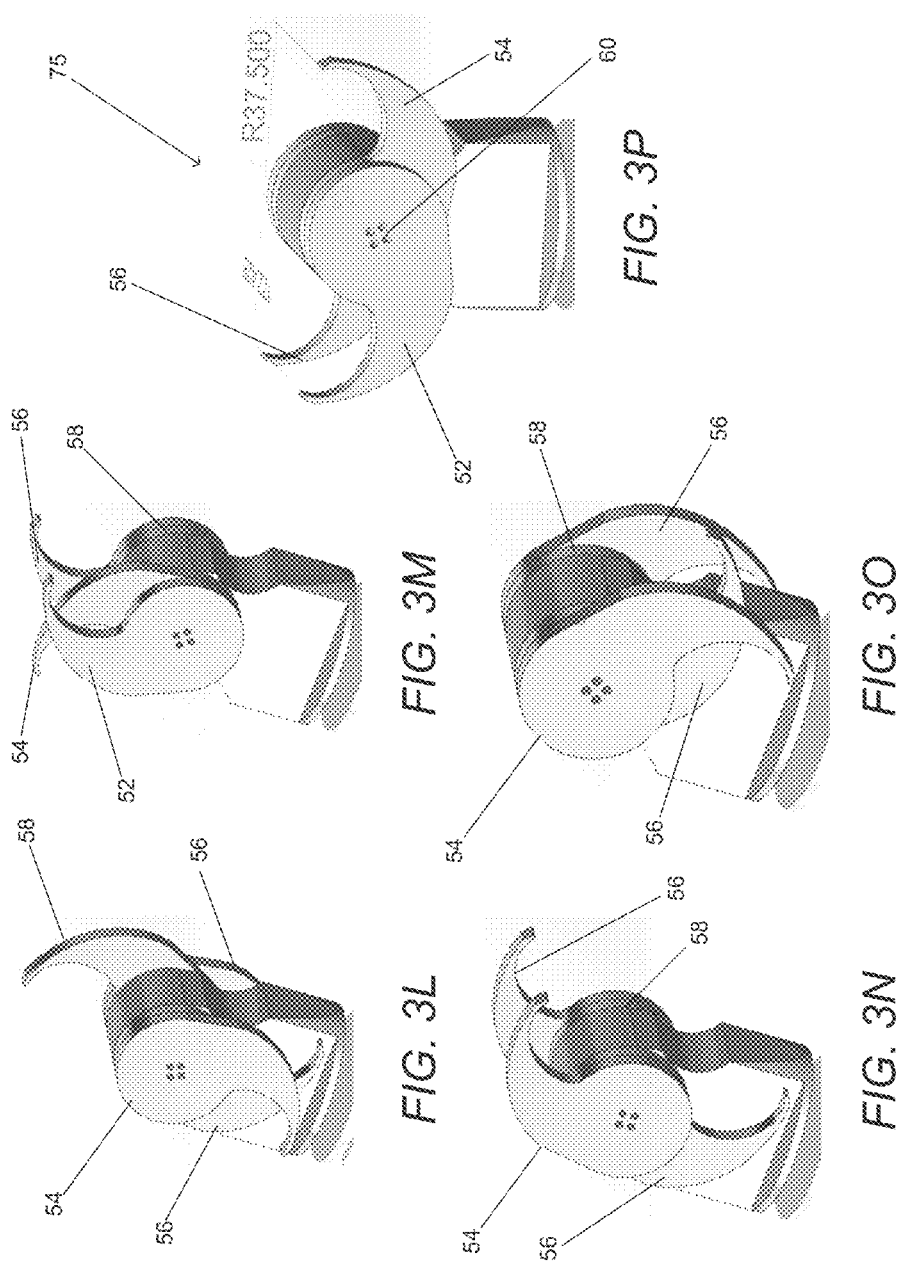

| Process | Computer | Description |
|---|---|---|
| launch-server | remote | Starts/Stops individual processes. Initializes limbs. |
| remote-server | remote | Remote robot operation and interface to processes on robot. |
| cam-server | high-brain | Captures imagery. Computes stereo, visual odometry and pose. |
| prep-server | high-brain | Produces manipulation and walking maps from multiple stereo cameras. |
| prep-server | high-brain | Generalized mobility and manipulation planner. |
| ctrl-server | low-brain | Communicates with the limbs, executes behaviors and motion specifications. |
| limb-server(1-4 and $dd^1$) | low-brain | Responsible for low-level motion commands and monitors limb health. |

*FIG. 6*

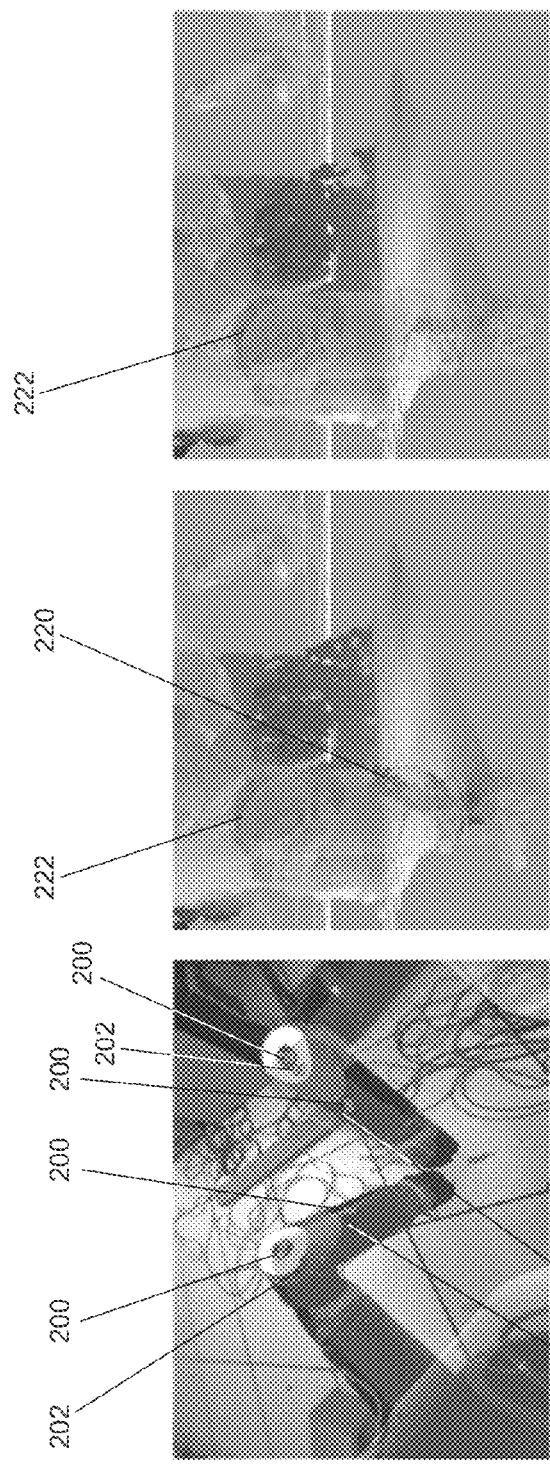

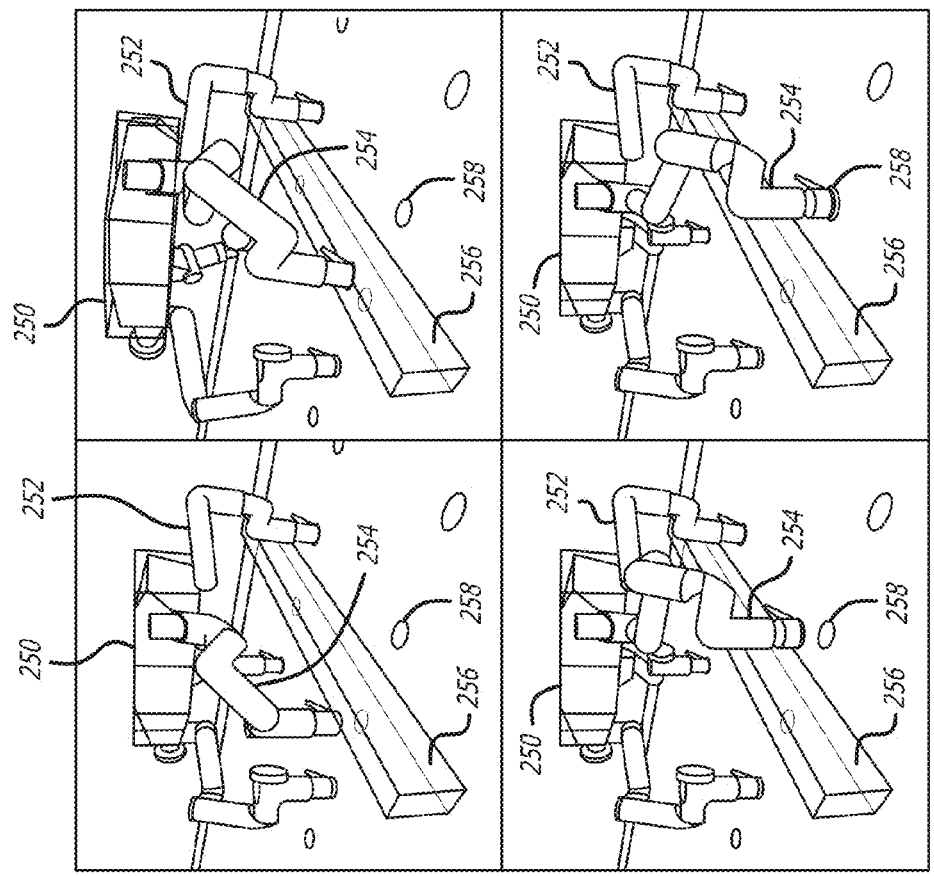

ROBOTICS PLATFORMS INCORPORATING MANIPULATORS HAVING COMMON JOINT DESIGNS

CROSS-REFERENCE TO RELATED APPLICATIONS

The current application claims priority under 35 U.S.C. § 119(e) to U.S. Provisional Patent Application Ser. No. 61/947,220, filed Mar. 3, 2014, U.S. Provisional Patent Application Ser. No. 62/060,158, filed Oct. 6, 2014, and U.S. Provisional Patent Application Ser. No. 62/080,040 filed Nov. 14, 2014. The disclosures of U.S. Provisional Patent Application Ser. Nos. 61/947,220, 62/060,158, and 62/080,040 are hereby incorporated by reference herein in their entirety.

STATEMENT OF FEDERAL SUPPORT

The invention described herein was made in the performance of work under a NASA contract, and is subject to the provisions of Public Law 96-517 (35 USC 202) in which the Contractor has elected to retain title.

FIELD OF THE INVENTION

The present application relates generally to robotics platforms, manipulators utilized in robotics platforms, computer and networking hardware utilized in robotics platforms, software architectures utilized in robotics platforms, vision systems, and various software processes that can execute on robotics platforms including (but not limited to) perception processes, planning processes, behavior processes, and control processes. The inventions claimed in the present application relate more specifically to manipulators used in robotics platforms utilizing a common joint design.

BACKGROUND

The term robot is typically used to describe an electro-mechanical machine that is guided by a computer program. Robots can be autonomous or semi-autonomous and range from humanoids to industrial robots. Mobile robots have the capability to move around in their environment and are not fixed to one physical location. Mobile robots are increasingly being developed for mobility over inhospitable terrain.

A number of robots that utilize manipulators both for mobility and manipulation, including robots built on the ATHLETE and LEMUR robotics platforms, have been developed at the Jet Propulsion Laboratory in Pasadena, Calif. with the assistance of a variety of collaborators. The ATHLETE robot incorporates six 6-degree of freedom limbs with an additional one degree of freedom wheel as an end-effector. The LEMUR robotics platform was utilized to build the Lemur I and Lemur IIa robots that both included six 4-degree of freedom limbs and the Lemur IIb robot that included 4 4-degree of freedom limbs. Research into the advancement of robotics platforms for greater capability and autonomy is ongoing.

SUMMARY OF THE INVENTION

Manipulators in accordance with various embodiments of the invention can be utilized to implement statically stable robots capable of both dexterous manipulation and versatile mobility.

Manipulators in accordance with one embodiment of the invention include: an azimuth actuator; three elbow joints that each include two actuators that are offset to allow greater than 360 degree rotation of each joint; a first connecting structure that connects the azimuth actuator and a first of the three elbow joints; a second connecting structure that connects the first elbow joint and a second of the three elbow joints; a third connecting structure that connects the second elbow joint to a third of the three elbow joints; and an end-effector interface connected to the third of the three elbow joints.

In a further embodiment, the same type of actuator is utilized to implement the actuators in each of the three elbow joints.

In another embodiment, the actuator comprises a motor including a power-on-to-disengage safety brake.

In a still further embodiment, each joint comprises at least one position sensor.

In still another embodiment, the at least one position sensor comprises an optical incremental encoder on a motor rotor and/or a capacitive absolute position sensor on an actuator output.

In a yet further embodiment, each joint includes a motherboard including connectors enabling daisy-chaining of power and communication harnessing.

In yet another embodiment, the three elbow joints have the same dimensions and construction.

In a still further embodiment again, the end-effector interface includes a six axis force and torque sensor.

Still another embodiment again also includes a hand assembly connected to the end-effector interface.

In a yet further embodiment again, the hand assembly is a cam hand assembly comprising a plurality of fingers including at least one pair of opposing fingers configured to rotate around a common axis.

In yet another embodiment again, the cam hand assembly comprises two pairs of opposing fingers configured to rotate around a common axis.

In a still further additional embodiment, a finger in each pair of opposing fingers are a slave pair and a second finger in each pair of opposing fingers are configured to move independently of each other.

In still another additional embodiment, each finger is a unitary piece comprising a concave edge and a convex edge that form a point.

In a yet further additional embodiment, the cam hand assembly comprises nested drive shafts configured to rotate the plurality fingers around the common axis.

In yet another additional embodiment, the cam hand assembly comprises a base containing motors, drivetrains, and electronics utilized to control poses for the plurality of fingers.

In a still yet further embodiment, the nested drive shafts are configured to rotate the two pairs of opposing fingers to clasp an object using a standard opposed wrap in a manner that forms a wrist with an effective 180 degree of freedom.

In still yet another embodiment, an edge in each pair of opposing fingers is configured to interface with an interior surface of a cylindrical object to provide a cam grasp.

In still yet another further embodiment, the hand assembly comprises a camera.

Manipulators in accordance with another further embodiment of the invention include: an azimuth actuator; three elbow joints that each include two actuators that are offset to allow greater than 360 degree rotation of each joint; a first connecting structure that connects the azimuth actuator and a first of the three elbow joints; a second connecting structure that connects the first elbow joint and a second of the three elbow joints; a third connecting structure that connects the second elbow joint to a third of the three elbow joints; an end-effector interface connected to the third of the three elbow joints; and a cam hand assembly connected to the end-effector interface, where the hand assembly is a cam hand assembly comprising a plurality of fingers including at least one pair of opposing fingers configured to rotate around a common axis. In addition, the three elbow joints have the same dimensions and construction. Furthermore, the same type of actuator is utilized to implement the actuators in each of the three elbow joints and the actuator comprises a motor including a power-on-to-disengage safety brake. Also, the cam hand assembly comprises nested drive shafts configured to rotate the plurality fingers around the common axis, and the cam hand assembly includes a base containing motors, drivetrains, and electronics utilized to control poses for the plurality of fingers.

In a yet further additional embodiment, the cam hand assembly base comprises a camera.

BRIEF DESCRIPTION OF THE DRAWINGS

FIGS. 1A-1E illustrate views of various designs of the RoboSimian robotics platform in a walking pose, a seated pose, a Vitruvian pose, and a table pose respectively.

FIGS. 2A and 2B illustrate a manipulator in accordance with an embodiment of the invention.

FIGS. 3A-3P illustrate various cam hand assembly end-effectors than can be utilized for both mobility and manipulation.

FIG. 6 is a table indicating processes executed by the RoboSimian robotics platform and the processors on which the processes execute.

FIG. 8D illustrates an image captured by a camera in which fiducials on robot limbs are visible.

FIGS. 8E and 8F conceptually illustrate the elimination from a 3D map of voxels associated with robot limbs using a mask image.

FIGS. 9A-9D conceptually illustrate use of an IK table to determine the positions of four limbs at the beginning and end of a step or body shift motion.

DETAILED DESCRIPTION

Figure 1D:
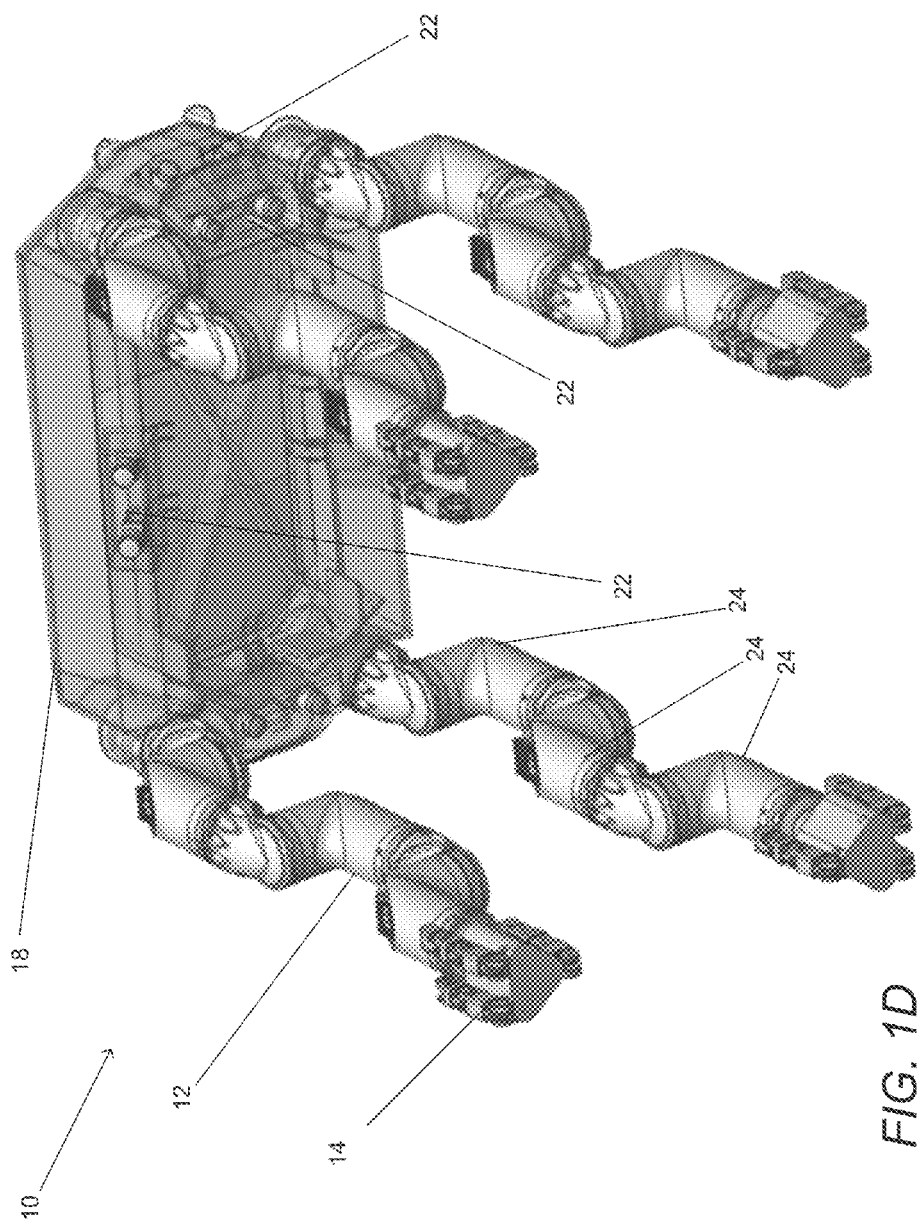
Figure 1E:
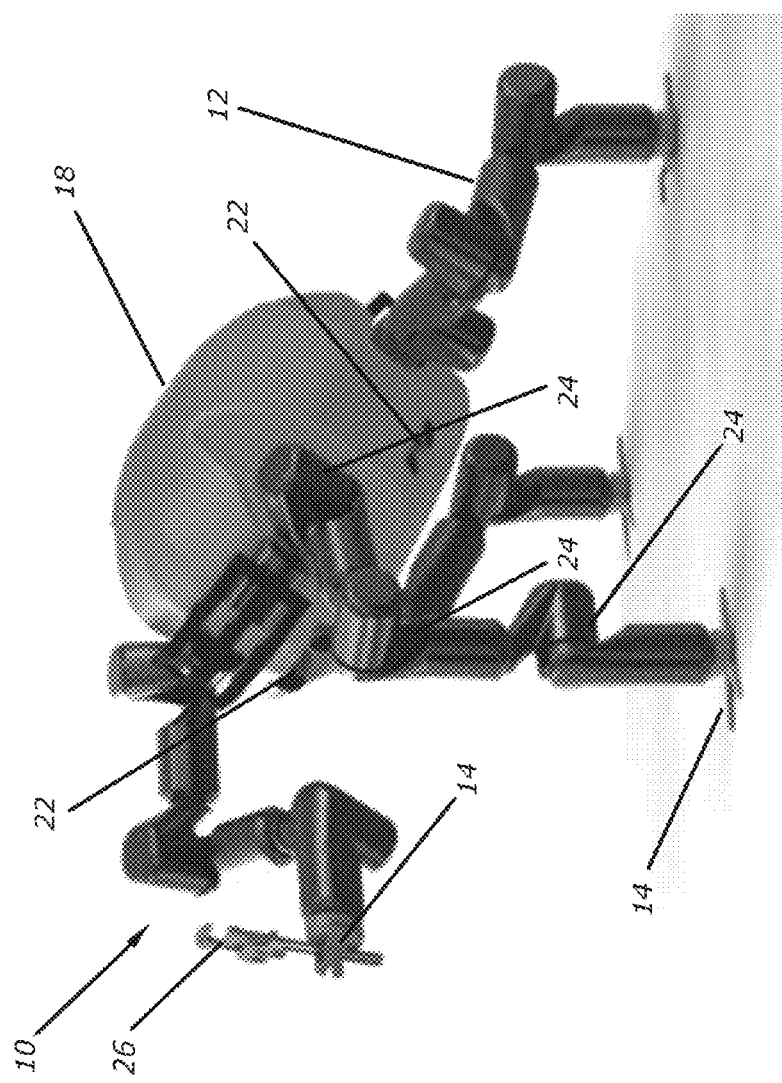

Turning now to the drawings, robotics platforms for implementing statically stable robots capable of both dexterous manipulation and versatile mobility are illustrated. In many embodiments, the robotics platforms utilize a common joint, common limb design to implement one or more manipulators. In several embodiments, the manipulators incorporate a cam hand design that can be utilized for walking and manipulation. In a number of embodiments, the robotics platforms use passive sensing to maintain pose, create 3D maps and maintain situational awareness. In various embodiments, the vision system is enhanced using active depth sensing modalities including (but not limited to) Light Detection and Ranging (LiDAR) systems.

In several embodiments, the robotics platforms utilize a software architecture incorporating a unified mobile manipulation planner for mobility and manipulation. In a number of embodiments, the robotics platforms utilize a combination of open-chain and closed-chain planner to develop motion plans. In various embodiments, the robotics platform incorporates a control and behavior process that executes the motions in accordance with a motion plan.

At a high level, robotics platforms in accordance with many embodiments of the invention utilize behavioral planners to generate a task specification for the unified mobile manipulation planner. In certain embodiments, the behavior planner can separately process manipulation behaviors and mobility behaviors involving one or more manipulators incorporated within the robotics platform.

While the inventions disclosed herein are capable of adaptation for use in a variety of robotics platforms, the RoboSimian robotics platform constructed at the Jet Propulsion Laboratory in Pasadena, Calif. incorporates many of the inventions and is frequently referenced for illustrative purposes. RoboSimian has generalized limbs and hands capable of both mobility and manipulation, along with almost fully hemispherical 3D sensing with passive stereo cameras. The system is semi-autonomous, enabling low-bandwidth, high latency control when operated from a standard laptop. Because RoboSimian's limbs are used for mobility and manipulation, a single unified mobile manipulation planner can be used to generate autonomous behaviors, including walking, sitting, climbing, grasping, and manipulating.

Various hardware platforms, and software systems that can be utilized to implement robots in accordance with embodiments of the invention such as (but not limited to) RoboSimian are described below. Section 1 provides an overview of the RoboSimian robotics platform. Section 2 describes the design and construction limbs, and joints that can be utilized in manipulators in accordance with embodiments of the invention. Section 3 describes a cam hand assembly that can be utilized with a variety of robotics platforms in accordance with many embodiments of the invention. Section 4 describes computer and networking architectures that can be utilized in robotics platforms in accordance with a number of embodiments of the invention. Section 5 describes software architectures that can be utilized in robotics platforms in accordance with certain embodiments of the invention. Section 6 describes a mechanics modeling system that can be utilized by robotics platforms in accordance with many embodiments of the invention. Section 7 describes a machine vision system that can be utilized in robotics platforms in accordance with various embodiments of the invention. Section 8 describes perception processes that can be utilized in accordance with many embodiments of the invention. Section 9 describes implementations of a unified mobile manipulation planner in accordance with certain embodiments of the invention. Section 10 discusses behavior planning processes in accordance with various embodiments of the invention. Section 11 reviews motion execution systems that can be utilized by robotics platforms in accordance with several embodiments of the invention. Finally, Section 12 discusses the software modules that can be utilized to enable remote operation of robotics platforms in accordance with a number of embodiments of the invention.

While much of the discussion that follows utilizes the RoboSimian robotics platform to illustrate various aspects of the invention, any of a variety of robotics platforms can utilize one or more inventive hardware and/or software systems similar to those incorporated into RoboSimian as appropriate to the requirements of specific applications in accordance with embodiments of the invention. Accordingly, the many inventive aspects of the robotics platforms described herein are introduced by first introducing the RoboSimian robotics platform.

1. Introduction to RoboSimian Robotics Platform

Views of various designs of the RoboSimian robotics platform in a walking pose, a seated pose, a Vitruvian pose, and a table pose are shown in FIGS. 1A-1E respectively. The RoboSimian robotics platform 10 was designed with the philosophy that a passively stable, deliberate robot would be safer, more robust, and sufficiently fast for mobility in difficult terrain. RoboSimian 10 has four general purpose limbs 12 and hands 14, capable of both mobility and manipulation. In several implementations, the RoboSimian robotics platform incorporates two active wheels 16 on its body 18, and two passive caster wheels 20 on its limbs 12. RoboSimian's limbs and/or wheels can be used to achieve passively stable postures, while remaining highly mobile and dexterous. The robot uses multiple stereo cameras 22 to achieve nearly full 360 degree passive, low-power 3D sensing. In the illustrated implementations, RoboSimian has four identical limbs 12. Each joint 24 within the limb can use an identical electric rotary drivetrain, which can minimize cost and complexity, and simplify maintenance.

The RoboSimian robotics platform has generalized limbs 12 capable of both mobility and manipulation arranged in an axi-symmetric fashion (see FIG. 1C). In order to achieve the stability and robustness that drives the RoboSimian design, the robot 10 ideally has at least three points of contact while still being able to manipulate an object, thus suggesting a minimum of four limbs. As can readily be appreciated, robots in accordance with various embodiments of the invention can be constructed with more than four limbs. Furthermore, many of the inventive aspects of RoboSimian can be utilized on robots that include no limbs and/or are bi-pedal. Accordingly, the specific implementation of a robot in accordance with an embodiment of the invention is typically dictated by the requirements of a specific application and not limited to a specific structure and/or limb configuration.

The under-actuated hands 14 incorporated in many implementations of the RoboSimian robotics platform can be significantly less complex than a human hand with fewer digits and active degrees of freedom, but can accomplish the set of grasps needed for effective operation in various applications including (but not limited to) disaster scenarios. The under-actuated hands 14 serve as the robot's feet and enable the manipulation of objects. The manner in which the RoboSimian robotics platform can grasp an object using a hand 14 located on a first limb 12 while achieving a passively static posture using three other limbs, where the hands on the stabilizing limbs act as feet, is conceptually illustrated in FIG. 1E. RoboSimian 10 is illustrated as manipulating a wrench 26 grasped in one of its hands 14, while supported in a passively static posture using the hands 14 on its other limbs.

Much like the overall design of the other hardware in the RoboSimian robotics platform, the body 18 design was centered around symmetry and simplicity while leaving ample room for ease of access to necessary internal components. Following this approach, mass and volumetric savings were achieved by using a monolithic aluminum structure. This structure was able to serve as the component deck to which all internal components and limbs 12 could be mounted with no additional structural elements. In implementations of the RoboSimian robotics platform for use in urban disaster relief, the body 18 shape and size can be designed to fit into and through confined spaces. Accordingly, a body 18 shape can be utilized with an aspect ratio to be slightly rectangular in order to fit the required internal components (compare the body shapes in FIGS. 1A-1D with the body shape in FIG. 1E). As can readily be appreciated, any of a variety of construction techniques and/or body shapes can be utilized to construct the body of a robot as appropriate to the requirements of specific applications in accordance with various embodiments of the invention.

In many embodiments, a battery (not shown) is located within the center of the body 18 to keep mass low, centralized, and to fit within the body shell. This battery can be swappable and can be easily accessed by releasing four over-center latches that can be used to hold the upper body shell on (not shown). Upon removing the upper body shell, virtually all internal components can be accessed, diagnosed or swapped with the removal of a few small fasteners at most. Note that the RoboSimian chassis and internal components can all be assembled and tested on a table top. Limbs, cameras, and any other external components can also be easily accessed or swapped with the removal of the body shell. This design allows RoboSimian to be a highly versatile multiple sub-system robot which can be quickly changed, re-configured or added to at any time.

In many implementations of the RoboSimian robotics platform, an operator can control the robot 10 by issuing high level commands based on images and 3D data sent back by the robot. The operator can use standard input devices (e.g. mouse and keyboard) to designate parameterized behaviors. Given a desired behavior, software executing on computing systems contained within the robot 10 can plan safe motions, and after the operator reviews and approves the plan, the robot can execute the behavior.

While the RoboSimian robotics platform is illustrated in FIGS. 1A-1E, any of a variety of the features of the RoboSimian robotics platform can be incorporated into other robotics platforms as appropriate to the requirements of specific applications in accordance with embodiments of the invention.

2. Manipulator Design

Traditional anthropomorphic robotic design dictates that robotic joints be larger in the proximal location and decrease in size and torque capacity towards the distal end of a limb. This is reasonable because moment loads generated by an outstretched limb or iron cross are greatest at the proximal joints and decrease toward the distal end. Once a robot grasps a rigid object (such as a ladder or vehicle roll cage) with multiple limbs, the forces imparted to the robots limbs become symmetric. Loads at the distal joints and proximal joints can be equally large and damaging. Therefore, manipulators in accordance with many embodiments of the invention utilize the same lightweight, high-torque actuator design for each of the joints within the manipulator. In the case of the RoboSimian robotics platform, a combination of 28 similar joints is used to implement four limbed versions of the robotics platform.

There are several advantages to using the same joint to construct a manipulator: 1) engineering resources can be focused on designing a single high performance actuator; 2) economies of scale resulting from larger quantities of machined parts and commercial off-the-shelf (COTS) components lead to lower production costs as items are ordered in bulk quantities; and 3) field support becomes easier as there is only a single actuator unit to swap out. Repairs can also be simplified as spare components only need to be stocked for one design.

Each limb in the implementations of the RoboSimian robotics platform illustrated in FIGS. 1A-1E has seven degrees of freedom and can be broken down into simple subcomponents. The limb design utilized in the RoboSimian robotics platform can be generalized for use as a manipulator in any of a variety of robotics applications. In robotics, a manipulator is commonly considered to be any device that can be utilized to manipulate an object and/or a material without the need for the operator of the manipulator to directly contact the manipulated object or material. A manipulator in accordance with an embodiment of the invention is illustrated in FIGS. 2A and 2B. The manipulator 30 includes three joints 32 that are configured as elbow assemblies and an azimuth actuator 34 connected to the body 36 of the robotics platform. In the illustrated embodiment, the manipulator includes a hand assembly 46 as an end-effector in which three articulated fingers 48 can be utilized to manipulate objects (e.g. configuration shown in FIG. 2B) and retracted for mobility (e.g. configuration shown in FIG. 2A). In other embodiments, any of a variety of end-effectors can be utilized as appropriate to the requirements of specific applications.

A joint 32 contains two actuators 38, 40 paired orthogonally with connecting structure 42. The joints are linked together with additional structure 44. In the illustrated embodiment, non-structural elbow caps can be fitted to cover the actuator electronics in each joint and allow easy access to the motor controllers. Caps having molded rubber inserts (elbow pads) can be utilized that protect the structure from scrapes and scratches. In several embodiments, wire harnessing is run through a centerbore of each actuator and down the manipulator, breaking off at each distributed motor controller. In a number of embodiments, the manipulator terminates in a 6-axis force/torque sensor that serves as an interface to end-effectors including (but not limited to) the various hand assemblies discussed below. The mechanical configuration of the manipulator has the actuators 38, 40 offset in a manner that allows greater than 360° rotation, limited only by wire harness twist. This can afford the limb greater flexibility and increases the solution set for a given motion. The manner in which planning software can plan the motion of a manipulator in accordance with embodiments of the invention is discussed further below. The offset of the actuators resulting from the elbows in the joints can also have the additional benefit of allowing for compact storage of the manipulator.

The actuators utilized in an implementation of the limbs of the RoboSimian robotics platform includes commercial off the shelf drivetrain components mounted and housed by custom machined aluminum parts. A frameless DC brushless motor directly drives a 160:1 harmonic drive, with the output supported by a crossed-roller bearing. A power-on-to-disengage magnetic safety brake is included on the motor rotor and is able to hold a torque at the output side. The power-on-to-disengage magnetic safety brake can be important in applications, where the robot may have to hold limb poses for long periods of time. In several embodiments, various position sensors can be included in each joint of a manipulator including (but not limited to) an optical incremental encoder on a motor rotor and/or a capacitive absolute position sensor on the actuator output. In a number of embodiments, actuator electronics are mounted on the back side of the actuator and together with the mechanical components form the actuator assembly, the building block of the manipulator.

In several implementations of the RoboSimian robotics platform the limb electronics include a custom motherboard, which hosts an Elmo Gold Whistle servo drive manufactured by Elmo Motion Control Ltd. of Redmond, Wash. for the drive electronics and a microcontroller to handle the brakes and actuator health monitoring. The servo drive and microcontroller communicate with the upstream electronics and the robotics platform on EtherCAT and RS-485 networks respectively. The motherboard also has connectors to allow daisy-chaining of the power and communications harnessing. In other embodiments, any of a variety of implementations of the actuators and electronics of a manipulator can be utilized as appropriate to the requirements of specific applications. A variety of different hand assemblies that can be utilized in the implementation of manipulators in accordance with embodiments of the invention are discussed further below.

3. Hand Assemblies

Similar to its namesakes, the RoboSimian robotics platform is intended to use all of its extremities for both mobility and manipulation. Accordingly, a variety of hand assemblies can be utilized in conjunction with the limbs of a robot constructed using the RoboSimian robotics platform. In many embodiments, a hand assembly is utilized that can be walked on in addition to being able to perform manipulation tasks.

A set of stumps with the same form factor as the hands but without fingers can also be utilized for applications of the RoboSimian robotics platform in which the limbs are not utilized for manipulation and/or for periods of operation of the platform in which the limbs of the robot are primarily utilized for mobility. The stumps can be changed between activities with the set not in use stored inside the body shell and/or an appropriate location accessible by the robot.

Various cam hand assembly end-effectors incorporating a gripper than can be utilized for both mobility and manipulation are illustrated in FIGS. 3A-3P. A four fingered embodiment of the cam hand assembly is shown in FIG. 3A. The cam hand assembly 50 includes four fingers 52, 54, 56, 58 that are configured to continuously rotate around a common axis 60. Both sides of the fingers 52, 54, 56, 58 can be utilized for various different types of manipulations and can be utilized for various functions including (but not limited to) scissor-style cutting. In many embodiments, the cam hand assembly 50 is scaled to human tools and has the ability to manipulate human-scale objects. In other embodiments, the scale of the cam hand assembly can be determined as appropriate to the requirements of specific applications.

In the illustrated embodiments, the fingers 52, 54, 56, 58 are unitary pieces that to rotate around the common axis 60 using nested drive shafts. Each unitary piece is a comparatively flat piece of metal including a convex edge and a concave edge that converge to form a point or tip of the finger. The edges of the unitary piece can be machined to provide specialized functionality such as, but not limited to, serrated edges for sawing, and sharpened edges for cutting. In several embodiments, the cam hand assembly base can contain the motors, drivetrains, and electronics utilized to control the fingers 52, 54, 56, 58. In a number of embodiments, the body of the hand is a monolithic aluminum part that houses the mechanisms and drive electronics for the fingers, as well as providing structural rigidity for the full weight of the robot while walking. The palm is constructed from a high-durometer molded polyurethane that is both robust for walking and conformable and tacky for manipulation. The palm also accommodates a USB web camera to assist with teleoperation, but this feature was left out for the competition hands.

In many embodiments, the cam hand assembly can be connected to a manipulator via an interface plate 61. In other embodiments, cam hand assemblies can be integrated with a manipulator and/or detachable via any of a variety of releasable attachment mechanisms appropriate to the requirements of a specific application.

In a number of embodiments, the cam hand assembly is implemented with four fingers including one slave pair of fingers 52, 58 and two independent fingers 54, 56. In other embodiments, all of the fingers are capable of independent movement. When manipulating objects, both the inside and outside surfaces of each finger can be used. The continuous rotation of the fingers enables the cam hand assembly to achieve a number of useful poses for mobility and manipulation. A variety of walking poses in accordance with embodiments of the invention are illustrated in FIGS. 3B-3F. In FIG. 3B the fingers are rotated so that the tips of the fingers point upward from the contact surface 62 and generally flat surfaces 64 are directed against the contact surface. In an alternative walking pose illustrated in FIG. 3C, the fingers are rotated so that the tips of the fingers 66 engage the contact surface 62. A configuration that combines characteristics of the configurations shown in FIGS. 3A and 3B is shown in FIG. 3C. A first of the opposing fingers 54 is rotated to have a finger pointing upward and an edge surface 64 adjacent the contact surface. The second of the opposing finger pair 52 is rotated so that the tip 66 of the finger engages the contact surface 62. A walking pose in which the fingers are retracted to avoid harm is shown in FIGS. 3E and 3F. The fingers 52, 54, 56, 58 are rotated so that the tips of the fingers are rotated upward away from the contact surface.

Although specific walking poses are described above with reference to FIGS. 3B-3F, it can be readily appreciated that the cam hand assembly provides a wide variety of potential poses that may be useful for mobility and the specific pose utilized is typically dependent upon the requirements of a specific application. Various poses that can be utilized in the manipulation of objects are described below with reference to FIGS. 3G-3K.

The ability of a cam hand assembly in accordance with various embodiments of the invention to clasp an object using a standard opposed wrap in a manner that forms a wrist with an effective 180 degree of freedom is shown in FIGS. 3G and 3H. Opposing pairs of fingers 52, 54 grip an object 70. A 180 degree of freedom wrist is achieved based upon the rotation of the fingers relative to the common axis 60.

A wrist grasp that can enable grasping while walking and/or the grasping of two objects using a cam hand assembly is illustrated in FIG. 3I. Large hollow objects can be manipulated using the cam grasp shown in FIG. 3J and a hook grasp similar to that shown in FIG. 3K can be utilized to grasp rungs and railings.

As noted above, the specific poses utilized by a cam hand assembly is largely dependent upon the requirements of a specific mobility and/or manipulation task. Additional poses are illustrated in FIGS. 3L-3O, including a one finger poking pose (FIG. 3L), a wire cutting pose that utilized functional edges on opposing fingers (FIG. 3M), a cam hook pose (FIG. 3N), and a true pinch grasp (FIG. 3O). Any of a variety of additional poses can be utilized by the cam hand assembly as necessary.

Although much of the discussion of cam hand assemblies above describes a cam hand assembly that incorporates two pairs of opposing fingers, cam hand assemblies can be constructed using any number of fingers. A cam hand assembly 75 including three fingers 52, 54, 56 that are configured to rotate around a common axis 60 is shown in FIG. 3P. The three fingers form an opposing pair 52, 54 and an offset finger. In other embodiments, a larger number of fingers can be utilized including fingers that have specific functions that can rotate outward as necessary in a manner not unlike a Swiss army knife. The specific configuration of a cam hand assembly and the number and type of fingers that are utilized in its construction are in no way limited and can be selected as appropriate to the requirements of a specific application. Various computing and software systems that can be utilized to manipulate limbs and end-effectors of robotics platforms in accordance with embodiments of the invention are discussed further below.

4. Computer and Networking Architectures

Figure 4:
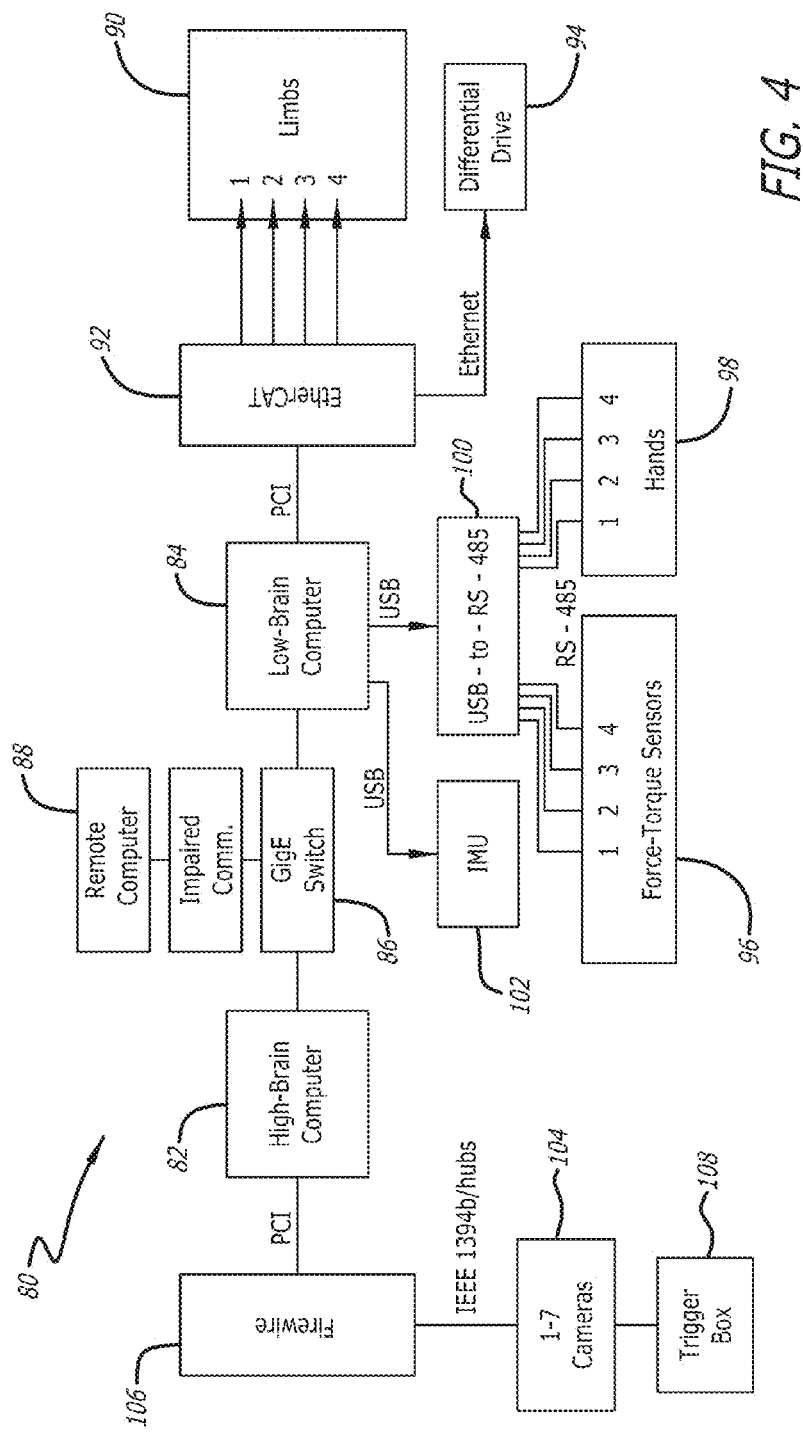
FIG. 4 conceptually illustrates the communication pathways utilized in the RoboSimian robotics platform.

The communication pathways utilized in the RoboSimian robotics platform are described and laid out in FIG. 4. The computer architecture 80 illustrated in FIG. 4 includes a high-brain computer 82 and a low-brain computer 84 networked via a GigE Ethernet switch 86. A remote computer 88 (i.e. the operator machine) is on the same network and can be connected to the network via a low-bandwidth/high-latency network connection than the network connection between the high-brain 82 and low-brain computers 84.

In the illustrated embodiment, the high-brain and low brain computers 82, 84 communicate over a Gigabit Ethernet link. Each of the high-brain and low-brain computers 82, 84, runs the 12.04 Ubuntu LTS open source operating system on an Intel Quad-Core i7 processor manufactured by Intel Corporation of Santa Clara, Calif. with 16 GB of memory. The low-brain computer 84 runs a low-latency (soft real-time) kernel and the EtherLabR open-source real-time kernel module, which runs low level processes such as limb and control processes. The high-brain computer 82 is responsible for higher level processes not concerned with real-time execution but rather higher throughput.

The low-brain computer 84 connects and communicates to each limb 90 through an Ethernet physical layer link 92. Control and communication to each limb as well as the differential drive 94 is achieved through the EtherCATR protocol. Using a tree topology of the EtherCATR network, each limb is a segment of the network and each joint in the limb is a slave along the network segment. The low-brain computer 84 also communicates to four force-torque sensors 96 that are placed at the end of each limb 90 just before each hand (not shown). In several embodiments, the force-torque sensors are force-torque sensors manufactured by ATI Industrial Automation of Apex, N.C. In other embodiments, any of a variety of sensors can be utilized to gather data with respect to the limbs as appropriate to the requirements of specific applications. Sensors can communicate to the low-brain computer 84 via RS-485 86 as the physical layer of a half-duplex serial protocol using a twisted pair down each limb. The hand controllers 98 can also communicate via RS-485 to the low-brain computer 84. These sensors communicate to the low-brain computer 84 via RS-485 as the physical layer of the Modbus protocol using a twisted pair down each limb. In several embodiments, a RS-485 to USB interface converter 100 is utilized to interface the RS-485 connections with the low brain computer 84. The Internal Measurement Unit (IMU) 102, a VectorNav VN-200 Rugged inertial navigation system (INS), is also connected via USB to the low-brain computer 84.

The high-brain computer's main connectivity is with the cameras 104. The high-brain uses a PCI express splitter 106 that connects multiple Point Grey Research IEEE 1394b PCI express cards, with each card having two IEEE 1394b ports. Each port is then connected to a Point Grey Research 5 port IEEE 1394b hub connecting the stereo pairs of cameras. In several embodiments, the stereo camera pairs are implemented using Point Grey Research Flea2 cameras. In many implementations, each stereo pair is externally triggered via a signal generator 108 that emits a 10 Hz square wave signal.

Although not shown, robots implemented using the Robo-Simian robotics platform can incorporate additional active depth sensing technologies including (but not limited) radar, sonar, light detection and ranging (LiDAR) systems, time of flight cameras, and/or structured-light 3D depth sensors. In one implementation, a robot constructed using the Robo-Simian robotics platform includes a HDL-32E LiDAR manufactured by Velodyne LiDAR of Morgan Hill, Calif. mounted on the top of the body of the robot, which can rotate a full 360 degrees up to 20 times per second as well as tilting between 10 degrees up and 30 degrees down. In many embodiments, a dedicated processor and/or system-on-chip receives data captured by the active depth sensor and provides processed distance measurements and/or image data to the high brain computer via an appropriate network connection. In other embodiments, the high-brain computer directly processes raw data obtained by active depth sensors.

As can readily be appreciated, any of a variety of computing platforms, network architectures, sensor, and camera configurations can be utilized within robotics platforms in accordance with embodiments of the invention. The specific processing, data communication, sensor information gathering capabilities, and machine vision systems utilized in a specific robot are largely dependent upon the requirements of a particular application. Software that can be executed by computing hardware within robotics platforms to perform various processes in accordance with embodiments of the invention are discussed further below.

5. Software Architectures

The software architecture and processes utilized by the RoboSimian robotics platform are designed to enable low-bandwidth, high latency control of a highly capable robot. In many implementations, the robot is capable of performing basic behaviors, such as walking to a designated location, grasping an object, and/or performing manipulation tasks autonomously. In many implementations, the software utilized in the RoboSimian robotics platform is model-based and data driven. In several implementations, the robot's software includes multiple processes running simultaneously on one or more computers inside the robot and/or on one or more remote computing systems. The operator is often responsible for designating and sequencing robot behaviors to perform complex tasks, such as turning a door handle, opening a door, and traversing through a doorway. The operator may be at a standoff location, without line-of-sight to the robot, and without a high bandwidth connection to either the robot or to a central command center. Therefore, the amount of processing on the operator control unit (OCU) is designed to be handled by a single standard laptop computer, and still provide sufficient situational awareness to the operator to perform complex tasks. Although the RoboSimian platform is described above as requiring a human operator, robots can be implemented in accordance with many embodiments of the invention that operate autonomously with little or no supervision.

Figure 5:
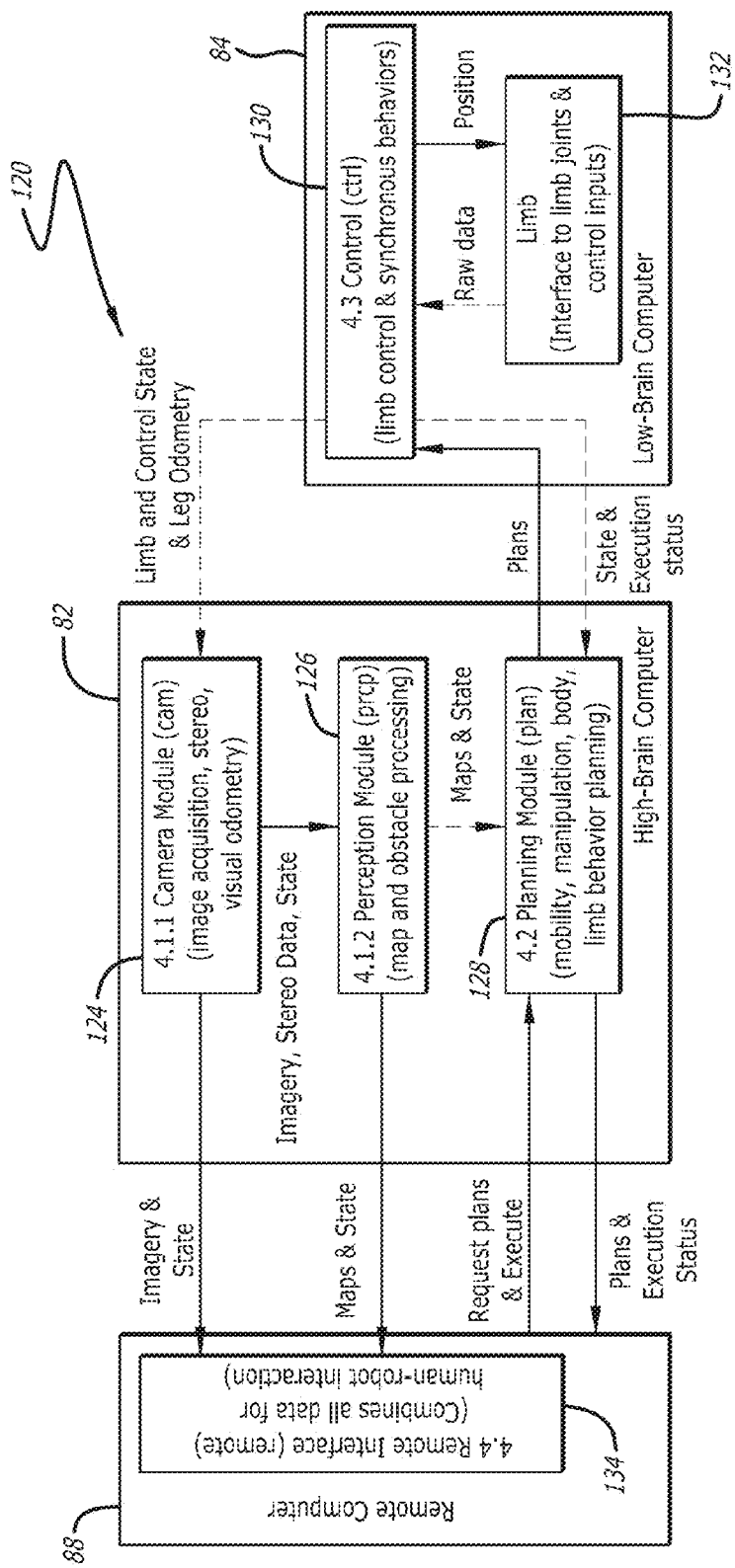
FIG. 5 illustrates a software architecture utilized on a robot implemented using the RoboSimian robotics platform.

A software architecture utilized on a robot implemented using the RoboSimian robotics platform is illustrated in FIG. 5. The software architecture 120 includes processes that communicate with each other via shared-memory and/or inter-process communication. In the illustrated embodiment, inter-process communication (IPC) occurs either through TCP or UDP. With IPC communication, each module subscribes to other modules' messages, which are sent asynchronously. Messages and data that can be sent as a constant stream are sent via UDP while one-off messages or messages requiring receipt confirmation are sent via TCP. Data products that are both large in size and sent as a stream are sent via shared-memory. Imagery and stereo data are sent via shared memory.

The software modules incorporated within the software architecture illustrated in FIG. 5 include a mechanics modeling (model) module that provides the infrastructure to create, modify, and query a model of the world and robot, and is used in almost all of RoboSimian's modules. The camera (cam) module 124 acquires imagery from the stereo cameras, computes stereo range images, and performs visual odometry. The perception (prcp) module 126 takes the image data and produces map and scene information. The plan module 128 produces feasible mobility and manipulation plans. The control (ctrl) module 130 executes the generated plans and behaviors by commanding the limbs through the limb modules 132. Lastly, the remote module 134 is the remote user-interface that enables an operator to view robot data and command the robot.

FIG. 5 graphically illustrates the processes and where they run, as well as the data they share and how they share it. Each light-gray colored block represents a separate software module/process and each arrow indicates the flow of data between each module. Each dark-gray colored block represents the computing systems on which each process runs. Solid, dashed and dotted lines represent TCP, UDP and shared-memory connections, respectively. The process and the computing hardware on which the processes execute is further summarized in the table shown in FIG. 6.

Although specific processes are shown as running on specific computing systems in FIG. 5, the type and number of processes, type and number of computing systems, and the computing systems on which the processes are run are largely dictated by the requirements of specific applications. Various software modules that can be utilized to implement software systems in robots in accordance with embodiments of the invention are discussed further below.

6. Mechanics Modeling

Additional modeling modules (also known as the "model manager") that are not shown in FIG. 5 can be utilized to maintain the kinematic, geometric, and other physical properties of the robot, objects, and environment. An appropriately selected model data structure can allow for fast (constant time) insertion, removal, and querying of simple (open chain, tree topology) kinematic models made up of physical bodies (links) and virtual joints. The models are structured so that individual properties of a body can be passed between different software modules, allowing one module to update certain aspects of the model and then communicate only this information to another module, which can then update its model. Using the model data structure and current state of the system, generic functions can be easily formed to compute forward kinematics, Jacobians, center-of-mass, and collisions. The model can also be drawn for visualization in operator interfaces or for debugging algorithms.

For collision detection, bodies can be padded to account for uncertainty, and collisions between any two bodies can be filtered in or out. Filtering of collisions can be important when the robot is expected to make contact with the environment, an object, or itself. The robot is modeled using primitive shapes, such as boxes and cylinders, to keep collision detection very fast. Objects, such as a tool that the robot might use, can also be modeled using primitive shapes, and can be attached to the robot end-effector to allow the system to account for the object's mass and geometry. Similarly, the environment can be segmented into oriented bounding boxes, each of which are added to the model.

Specialized algorithms can be used for closed form inverse kinematics of a robot limb, with multiple approaches for redundancy resolution. The most common approach is to search over a free joint and select the solution that minimizes some cost function. Because of RoboSimian's limb design, one of two joints can be allowed to be the free joint, resulting in solutions that are biased to minimizing pitch or roll joint motions. To reduce computation time, a search can be conducted over a limited angle range from the current joint angle. As a faster but less flexible alternative for inverse kinematics (IK), an iterative Jacobian-based solver can be utilized that is seeded with the limb's current joint angles, or a predefined set of joint angles.

Although specific modeling processes are described above, any of a variety of modeling processes can be utilized by robotics platforms as appropriate to the requirements of specific applications in accordance with embodiments of the invention. Vision systems that can be utilized by the robotics platform to obtain information concerning a robot's operating environment are discussed further below.

7. Vision System

Figure 7:
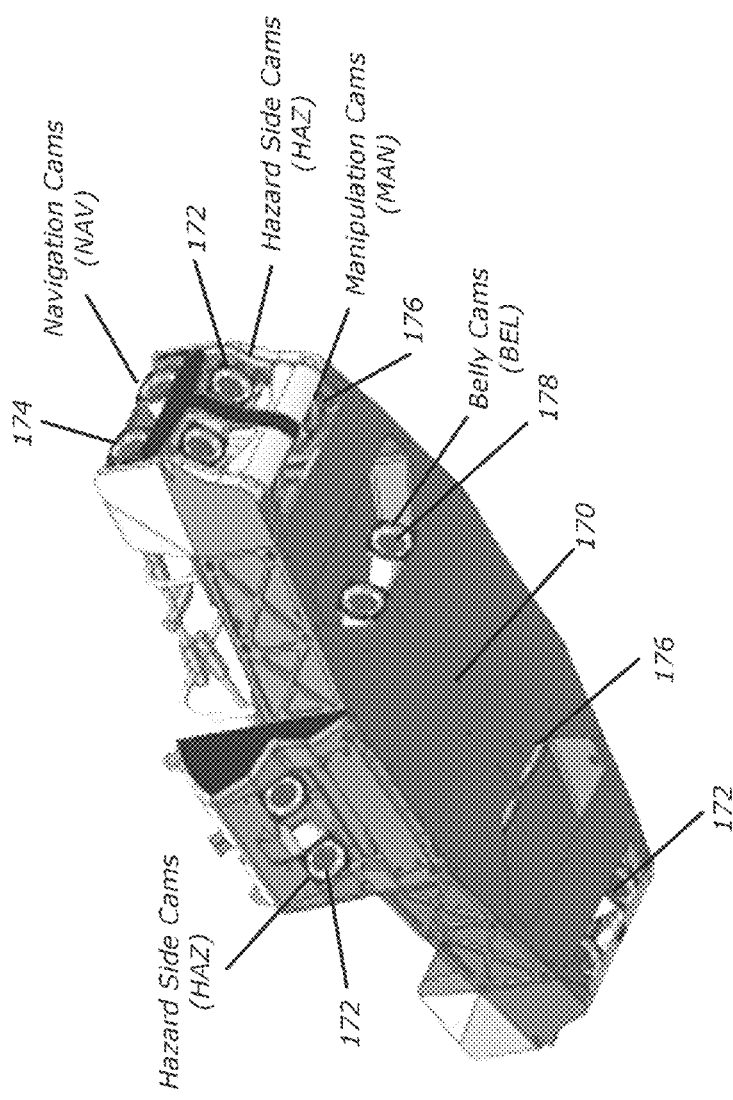
FIG. 7 illustrates a layout of stereo cameras utilized in a vision system of a robot implemented using the RoboSimian robotics platform.

The vision system of the RoboSimian robotics platform can utilize low-cost passive cameras and/or be augmented using depth sensors such as (but not limited to) LiDAR. Stereo cameras can provide context from imagery and 3-D data from stereoscopy. A layout of stereo cameras utilized in a vision system of a robot implemented using the RoboSimian robotics platform in accordance with an embodiment of the invention is illustrated in FIG. 7. The layout of stereo pairs of cameras around the body 170 of the robot is designed to provide complete 360 degree situational awareness (SA) by having 10 cm baseline stereo cameras all around the robot perimeter for hazard avoidance (also referred to as hazard cameras or HAZ cameras). In the illustrated embodiments, three of the four hazard avoidance stereo camera pairs 172 are visible. 360 degree coverage can be provided through the use of fish-eye lenses. These lenses provide a horizontal field of view (FOV) of 105 degrees and a vertical FOV of 73 degrees. Each camera in RoboSimian is the same Flea2 color camera manufactured by Point Grey Research of British Columbia, Canada having 1024×768 pixels. In several embodiments, additional hazard avoidance stereo pairs of cameras are provided and/or cameras having narrower field of view (FOV), and/or higher or lower resolution are utilized.

The hazard avoidance stereo pairs of cameras 172 alone typically cannot provide the scene context and map resolution that would be needed for the finer manipulation tasks that a robot constructed using the RoboSimian robotics platform may face. To resolve this, two additional stereo pairs of cameras are also added to the front face of the robot, stacked vertically around the front facing hazard avoidance stereo pair of cams. In the walking stance, one of the additional pairs 174 (NAV) having a 10 cm baseline faces straight forward to aid in navigation. In the sit posture, the second additional pair 176 (MAN) having a 12 cm baseline faces straight forward to aid in manipulation and driving. Note that whether forward-facing or rear-facing, In many implementations, robots implemented using the RoboSimian robotics platform are designed to be symmetric, so additional stereo cameras on the front end are also present on the rear end of the robot. In addition to the HAZ, NAV, and MAN camera pairs, a robot implemented using the RoboSimian robotics platform can also include a set of stereo cameras 178 mounted in the "belly" (BEL) of the robot that would be primarily used when the robot is in an upright posture.

Each camera's intrinsics can be calibrated using a CAHVORE model in the manner outline in Donald B. Gennery, *Generalized Camera Calibration Including Fish-Eye Lenses,* 68(3) Int. J. of Comput. Vision 239 (2006), which handles fish-eye lenses. The extrinsics calibration can be broken up into two steps. First, each stereo pair can be calibrated with respect to each other using a dot-patterned calibration board. If the two stereo pairs of cameras are able to fully view the calibration board, the relative pose between the pairs can be resolved. There may be cases in which two stereo pairs of cameras cannot simultaneously view the calibration board (e.g. MAN and HAZ). In this case, an intermediate camera can be used to act as a link between the two stereo pairs of cameras to resolve relative poses. These poses are then chained to generate a complete relative pose between the stereo camera pairs. The second step in the extrinsics calibration is to compute the relative pose between a stereo pair and the robot base frame (the frame used for the robot pose). This step can be performed by detecting fiducials on limbs of the robot and computing the relative pose between the kinematic fiducial pose in the robot base frame and the detected fiducial pose in the camera frame. This is discussed more in Section 8 and illustrated in FIG. 8D.

Referring again to FIG. 5, the cam module 124 is responsible for capturing all cameras simultaneously. Each camera can be triggered externally via a signal generator. In many embodiments, each stereo pair's acquired imagery is rectified and processed in a stereo processing pipeline. Stereo can be continually processed to produce depth maps using the image data captured by each of the pairs of cameras on a robot. Likewise, visual odometry (VO) can also be processed for each pair, which provides VO pose updates. In certain implementations, at any one time, only one camera pair's VO updates are used to compute the pose of the robot. However, if there is camera occlusion or if VO fails, the camera pair used for VO is switched to the next available and valid stereo pair of cameras. Stereo data and robot state are then passed to the perception (prcp) module 126, described further below, and can be used to compute environment maps and obstacle bounding boxes.

Although specific vision systems and processes for extracting depth information and visual odometry information using image data captured by the vision system are described above with reference to FIGS. 5 and 7, any of a variety of vision systems and/or processes for extracting information from image data captured by a vision system can be utilized on a robot as appropriate to the requirements of specific applications in accordance with embodiments of the invention. Perception systems that can be utilized by robots in accordance with embodiments of the invention are discussed further below.

8. Perception Systems

A perception system in accordance with many embodiments of the invention is responsible for building, maintaining, and processing 3D maps. The output of the perception system can be used by a planning process and/or the operator for collision-free motion planning, insertion of virtual objects into the map, and visual inspection of the environment as perceived by the robot.

In robots built using the RoboSimian robotics platform, the perception system utilizes depth maps generated using image data captured by stereo camera pairs, the visual odometry poses computed by the camera module and/or ranging information generated by a LiDAR system to build 3D maps. In one robot implemented using the RoboSimian robotics platform, the perception module maintains two specialized voxel-based maps. The first one, the manipulation map, is a high resolution (typical values ranges in between 0.02 m-0.05 m), n-tree 3D map structure. Processes for generating high resolution maps in real time using depth maps generated using image data captured by stereo camera pairs are described in Bajracharya et al., *Real-time 3D Stereo Mapping in Complex Dynamic Environments*, IEEE International Conference on Robotics and Automation—Semantic Mapping, Perception, and Exploration (SPME) Workshop (2012), the disclosure of which is hereby incorporated by reference in its entirety. The manipulation map can be used when moving the end-effector to manipulate an object in the world and can be sent to a remote module for visualization by an operator upon request. The second map is the walk map, which can be a coarse elevation map for walk planning. The walk map can be lower resolution and provides the basis for foot-step planning over rough terrain. In many implementations, the walk map can be generated using depth information obtained from image data captured by one or more stereo pairs of data. In several implementations, the walk map can be obtained using a LiDAR system and/or the combination of multiple depth sensing modalities. As can readily be appreciated any sources of depth information can be utilized to generate multiple maps at different resolutions as inputs to different planning processes utilized by a robot as appropriate to the requirements of specific applications in accordance with various embodiments of the invention.

Due to its high resolution and full 3D structure, the manipulation map has higher memory and processing requirements compared to the walk map. The real-time requirements of the system with current computing technology are strained if the manipulation map is built at large scales. High fidelity 3D structure matters most when manipulating objects. Therefore, the manipulation map's computational footprint can be kept bounded by expiring voxels in the map that are not seen in a set number of images and keeping the map size small enough to cover the workspace of a robot's end-effectors. In contrast, the walk map can be maintained for the entire extent of a run. The 2.5 D nature of the walk map can also enable the faster execution of planning processes.

Another type of processing performed on the 3D maps is surface normals based segmentation of the map into objects. As a result of segmentation, parts of the map that generally constitute a single entity (such as the ground plane or a brick that sits on the floor) can be abstracted to a bounding box. These bounding boxes are then used in collision checking since collision checking solely based on map voxels would be prohibitively slow, especially when a given configuration needs to be evaluated for collisions during motion planning.

Figure 8C:
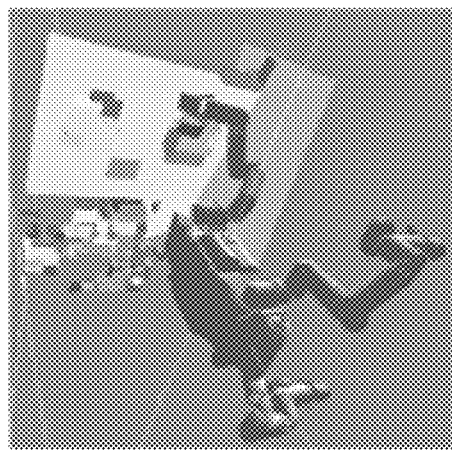
FIG. 8C illustrates a 3D map on which bounding boxes generated using surface normals based segmentation are overlaid.
Figure 8B:
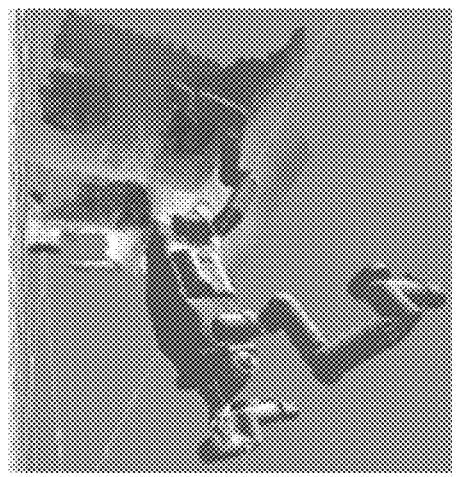
FIGS. 8A and 8B illustrate examples of a 3D walk map, and a 3D manipulation map generated from depth maps obtained using image data captured by a stereo pair of cameras.
Figure 8A:
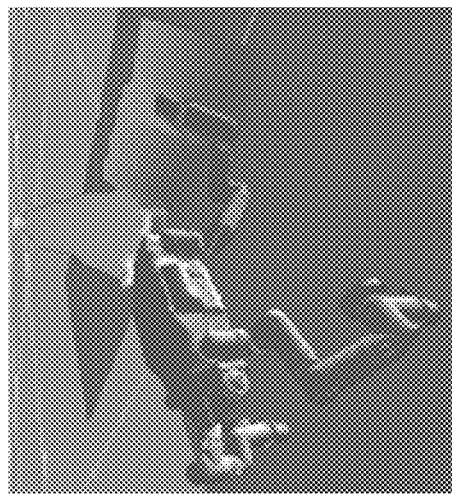

Examples of a walk map, and a manipulation map generated from depth maps obtained using image data captured by a stereo pair of cameras are shown in FIGS. 8A and 8B. A map on which bounding boxes generated using surface normals based segmentation are overlaid is illustrated in FIG. 8C.

As noted above, maps generated by the RoboSimian robotics platform can be utilized for collision free motion planning. Since RoboSimian's sensor coverage can include the limbs' workspace, often 3D points from a robot's own body appear in a map. This in turn can impact collision checking as the robot appears to be in collision with itself. In several implementations of the RoboSimian robotics platform, the solution chosen for this problem is to simulate a given camera's acquired image in a 3D virtual world (OpenGL context) tuned to that camera's model parameters and solely populated by the robot's CAD model. With up-to-date joint angles and given that the actual robot is built similar to the CAD model, this virtual view can act as a mask image to the stereo images that return range points. Thus using this mask image, 3D points that belong to a robot's own body can be deleted from acquired range images before they are inserted into the map.

In order to accurately project a robot's CAD model into a camera frame, the camera coordinate frame with respect to the robot's coordinate frame is determined. To this end, a fiducial detector can be utilized as described in Nicolas Hudson et al. *Model-based autonomous system for performing dexterous, human-level manipulation tasks*, 36.1-2 Autonomous Robots 31 (2014), the relevant disclosure from which is hereby incorporated by reference in its entirety. By placing fiducials at known positions on the limbs, the 6-DOF fiducial pose in the robot frame can be computed by forward kinematics. Further, by detecting the fiducials in acquired images, their pose in the camera frame can then be obtained. The camera's position in the robot frame can then obtained by running a least-squares optimization method that minimizes the Euclidean distance between the two fiducial poses. An image captured by a camera in which fiducials on robot limbs are visible is illustrated in FIG. 8D. The fiducials are detected 200 and compared to an initial estimate 202 of the locations of the fiducials in the robot frame. As noted above, the camera's position in the robot reference frame can then be obtained based upon the comparison of the observed and estimated fiducial locations.

Determining the portions of a robot's body that are visible within the fields of view of stereo cameras used to generate depth information enables the elimination of voxels attributable to the body of the robot from the maps generated by the robot using a mask image. Elimination of voxels associated with robot limbs using a mask image is conceptually illustrated in FIGS. 8E and 8F. Voxels associated with the robot limb 220 in the map shown in FIG. 8E are eliminated using a mask image 222 of the robot in the map shown in FIG. 8F. Although the processes described above with reference to FIGS. 8D-8F disclose generating masking images using a CAD model, any of a variety of techniques can be utilized to identify portions of the robot within the field of view of the vision system as appropriate to the requirements of specific applications in accordance with embodiments of the invention.

In several embodiments of the invention, the perception process converts the generated 3D maps from a voxel representation to a mesh based representation. Generating meshes from voxel maps can have several benefits. In applications where communication bandwidth between the robot and an operator is limited, transmitting each voxel in the map can incur long latencies wasting precious operator time. Furthermore, collision checking with the object bounding boxes explained previously can result in boxes that contain a significant amount of free space, unnecessarily limiting the motion capabilities of the robot. In contrast, a mesh of the map constructed from polygons such as (but not limited to) triangles can preserve the true surface boundaries of objects. A mesh structure can also be decimated so as to reduce the number of triangles used to represent the map. This reduction removes detail that is redundant as in planar parts of the map or unneeded as in parts that are far away from the robot whose fine structure is not relevant to the task at hand.

Figure 8G:
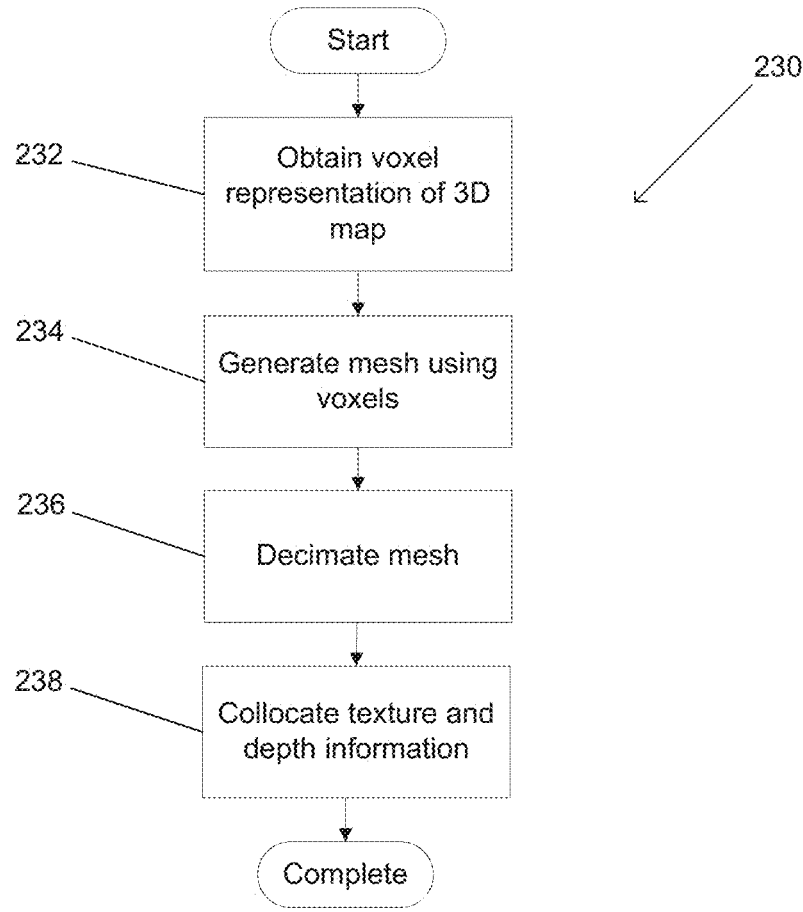
FIG. 8G illustrates a process for generating a 3D map using meshes using a voxel representation of the 3D map.

A process for generating a 3D map using meshes using a voxel representation of the 3D map is illustrated in FIG. 8G. The process 230 includes obtaining (232) a voxel representation of a 3D mesh and generating (234) a mesh using the voxels from the voxel representation of the 3D map. For mesh generation, processes such as (but not limited to) the marching cubes algorithm described in W. E. Lorensen and H. E. Cline, *Marching cubes: A high resolution* 3d *surface construction algorithm,* 21(4) Computer Graphics 163 (1987) can be performed at each voxel. By looking at the surface crossing at each voxel, this algorithm generates triangles at a per voxel basis, hence being highly parallelizable. Other meshing algorithms that can be utilized include (but are not limited to) dual contouring and adaptive skeleton climbing that have certain advantages over marching cubes were not considered because of the computational penalty that comes with them. Once a mesh representation of the 3D map is generated, the mesh can be decimated (236) to enable a more compact representation of the 3D mesh. The decimation of the mesh is done by determining the cost of removing each vertex in the mesh and greedily removing those vertices until the resulting mesh has a certain number of vertices. The process returns (238) the decimated mesh and completes. Although various processes for generating an efficient 3D mesh based representation of a 3D map are described above with reference to FIG. 8G, any of a variety of processes can be utilized to generate mesh based representations of 3D maps based upon voxel representations as appropriate to the requirements of specific applications in accordance with embodiments of the invention.

Figure 8H:
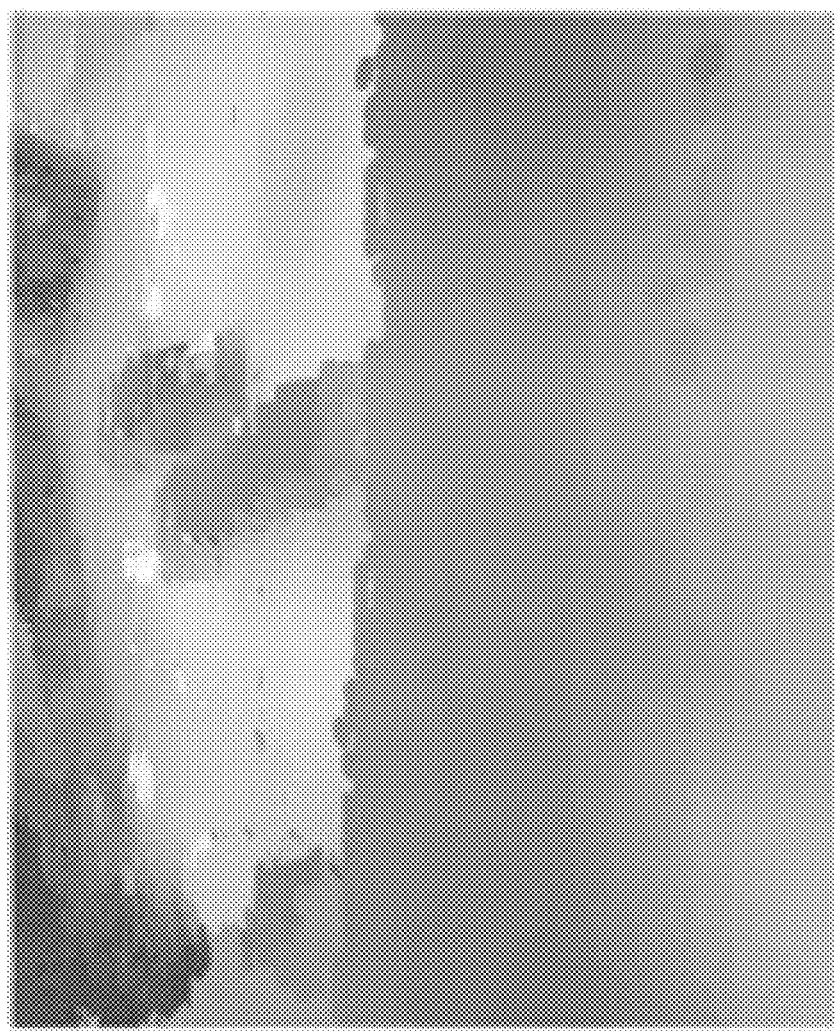
FIGS. 8H-8J is a sequence of images that conceptually illustrate a process of converting voxels to pixels.
Figure 8I:
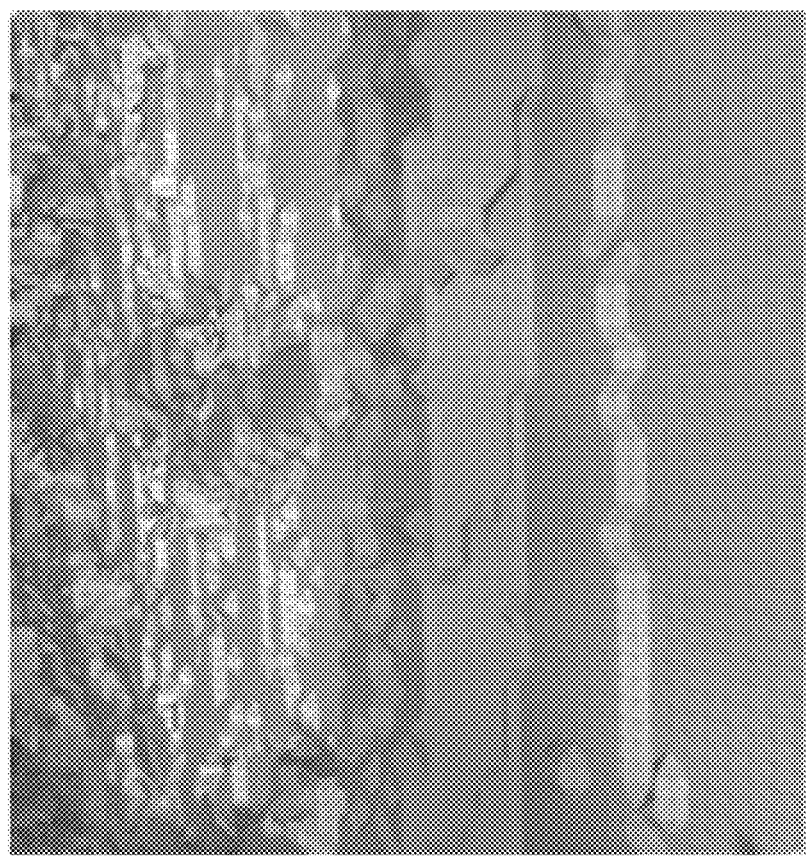
Figure 8J:
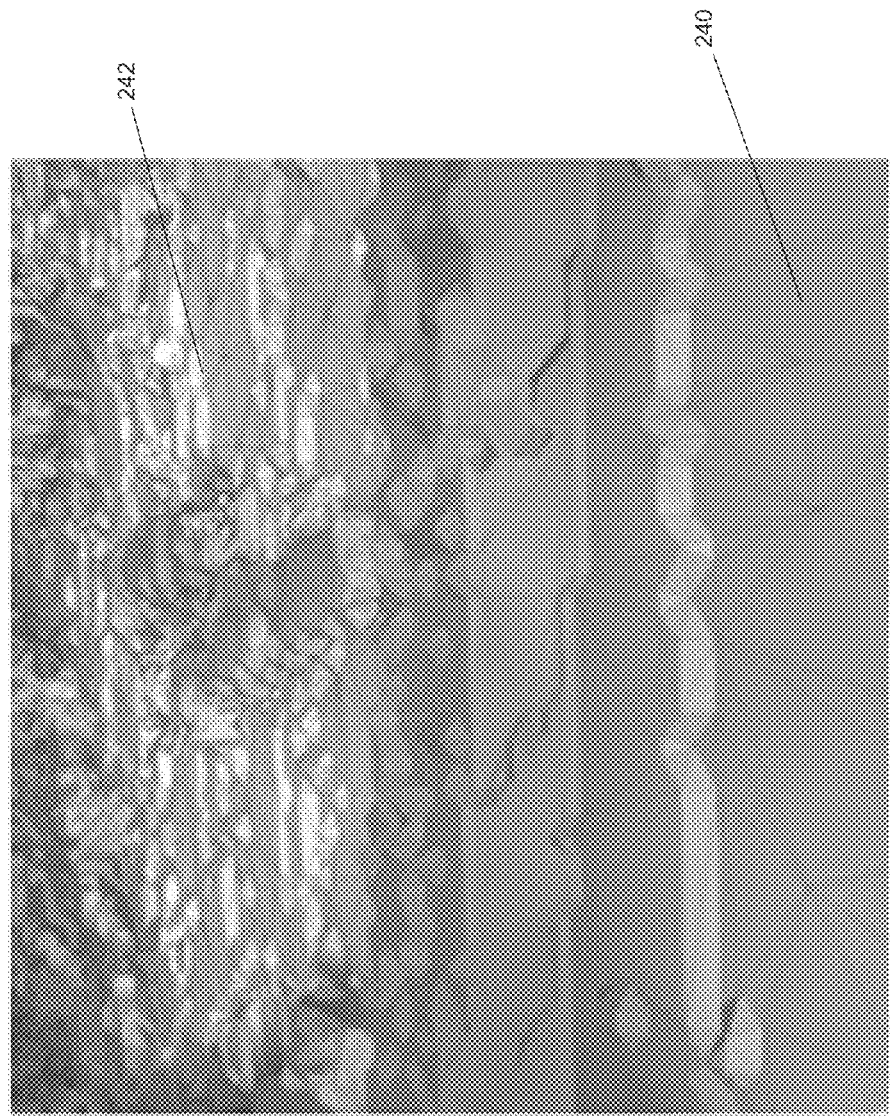

The sequence of images in FIGS. 8H-8J illustrate a process of converting voxels to pixels that can be utilized in perception modules of robots in accordance with embodiments of the invention. A voxel map is illustrated in FIG. 8H. The voxel map is converted to a mesh of triangles using processes similar to those described above in FIG. 8I and the meshes are decimated to yield the mesh of triangles illustrated in FIG. 8J. The mesh illustrated in FIG. 8J includes fewer triangles to describe flat surfaces 240 and the detail of distance surfaces 242.

Although specific perception processes are described above, any of a variety of perception processes can be utilized to generate one or more 3D maps based upon information obtained via any of a variety of depth sensing modalities as appropriate to the requirements of specific applications in accordance with embodiments of the invention. The manner in which planning processes can utilize 3D maps generation by perception processes to plan robot behaviors in accordance with embodiments of the invention is discussed further below.

9. Planning Processes

Planning of behaviors can be performed onboard a robot constructed in accordance with various embodiments of the invention using a combination of a mobile manipulation motion planner and a behavior planner. Given a paramterized behavior, such as (but not limited to) grasp an object, and the world state from perception data, the behavior planner can determine the goal state for the robot's body and limb end-effectors. The motion planner can then be used to determine the motions of the limbs to maintain stability and achieve the desired body and end-effector poses.

The RoboSimian robotics platform uses a unified mobile manipulation motion planner to generate all the motions that it executes. The motion planner can enable a robot to stay statically stable at all times. In addition, the motion planner can confirm that all motions are kinematically feasible, kinodynamically smooth, and collision free (except when contact is expected). In operation, the motion planning process continuously replans motions to account for sensing and/or execution uncertainty. Planning time scales with the complexity of a problem, but plans can be generated in tens of milliseconds using hardware and/or software architectures similar to those described above.

When implemented with four 7-DOF limbs, four 3-fingered hands, and its differential drive wheels, the RoboSimian robotics platform is an extremely capable and flexible mechanism. However, because of the number of degrees of freedom, achieving a desired motion by manually moving the actuators is difficult and dangerous. Furthermore, manually coding efficient and safe motions, even for relatively simple sequences such as statically stable walking, is difficult due to the amount of coordination involved in combination with the extremely flexible, but sometimes non-intuitive, kinematic configuration of the robot. Consequently, to keep the robot safe and stable, and to exploit the robot's capabilities, the motion planning process typically generates all motions.

In order to exploit the RoboSimian robotics platform's ability to walk, climb, sit, manipulate, roll, and smoothly transition between behaviors, a single, unified mobile manipulation planner capable of planning all motions is utilized. In parallel, specialized planners can be utilized that are optimized for certain behaviors, such as walking and/or driving. While these planners can perform specialized tasks better, transitioning between the planners is a non-trivial integration problem. Accordingly, many applications of robotics platforms in accordance with embodiments of the invention do not involve the use of specialized planners.

Generality and speed can be achieved by decomposing the mobile manipulation planning problem into a combination of open-chain and closed-chain motion planning problems. In several embodiments, an open-chain planner plans the motions of an unconstrained serial manipulator system in joint space. The closed-chain planner plans the motion of a parallel manipulator system in Cartesian space of the manipulator base frame. In many implementations of the RoboSimian robotics platform, this can typically be thought of as moving a limb end-effector, or moving the body while keeping the robot's points of contact stationary. In combination, the two planners can perform almost any task, including walking, climbing, transitioning to sitting, adjusting the body posture, single-limb manipulation, dual-arm manipulation, and driving. The open-chain planner can be implemented using a planner such as (but not limited to) the Rrt-Connect planner disclosed in J. J. Kuffner and S. M. LaValee, *Rrt-connect: An efficient approach to single-query path planning*, vol. 2 Proceedings. ICRA, 995 (2000) with greedy path smoothing. Processes for performing greedy path smoothing are disclosed in Nicolas Hudson et al. *Model-based autonomous system for performing dexterous, human-level manipulation tasks,* 36.1-2 Autonomous Robots 31 (2014), the relevant disclosure from which is hereby incorporated by reference in its entirety. It can be used on any number of degrees-of-freedom of a serial manipulator, but the RoboSimian robotics platform typically only uses the open-chain planner for a single 7-DOF limb, attached at the chassis shoulder. This planner assumes the end state is specified as joint angles; because there are typically redundancies in the manipulator, the goal angles are chosen by a behavior planner, which optimizes the use of the redundant degrees-of-freedom when performing the limb inverse kinematics. Behavior planning processes in accordance with embodiments of the invention are discussed further below.

In many implementations, the closed-chain planner simply interpolates the base frame from its current pose to the goal pose, with the possibility of a single randomly selected intermediate pose. During each step of interpolation, the joint angles are computed from the limb IK for limbs in contact. The intermediate pose is only used if the initial motion is not feasible, and is limited to only several iterations of random sampling. The search could be implemented as a rapidly-exploring random tree (RRT), but use of an RRT is not necessary in many applications in which use of intermediate poses is rarely necessary. Due to the planner decomposition, the natural way to specify tasks is by specifying a desired body pose (position and orientation) and the desired limb end-effector poses. Given these inputs, a high level planner can search for a global plan using the two base planners to achieve the desired end state. A simple finite-state machine (FSM) can be used to transition between the planners and some basic behaviors.

In many embodiments, the high level global planner is a brute force search over body and limb motions to achieve the goal. For example, for walking, the high level planner can attempt to achieve the desired body pose and end-effector poses by moving the end-effectors in a fixed order, moving the body to remain statically stable on the remaining limbs or points of contact. If the goal cannot be achieved, it can then compute an intermediate goal, and attempt to achieve the intermediate goal in the same way. If no global plan can be found with the limb order being used, the global planner can use a new limb order. In practice, seven limb orders can be used for a quadruped, which are selected by regression testing all possible limb orderings in simulation, and choosing the ones that most commonly lead to a feasible solution. For each high level command provided, the planner first computes a global plan for the entire motion sequence to ensure it is feasible. However, when the system actually starts executing the sequence, each motion is replanned before it is executed to account for inaccuracies in execution. For computation efficiency, only the single next motion is planned, rather than replanning the entire sequence to the goal. This assumes that there are no large deviations during execution, which is reasonable since the system is designed to fault and stop if there is a large unexpected deviation. The replanning architecture also allows the planner to react to unexpected end-effector poses. If the motion hits the terrain early or late, the planner reacts by adjusting the body posture during the next move. In general, the planner tries to keep the body roll and pitch aligned to the average pitch and roll of the end-effectors. This naturally makes the robot climb up steep objects, such as a wall or ladder.

Although specific motion planning processes are described above, any of a variety of motion planning processes can be utilized to plan motion and manipulations as appropriate to the requirements of specific applications in accordance with embodiments of the invention. The manner in which high level behavioral plans can be developed to direct motion planning in accordance with various embodiments of the invention are discussed further below.

10. Behavior Planners

In many cases, generating the task specification (the body pose and limb end-effector poses) for the motion planner is non-trivial. For example, when turning a valve, the robot needs to know where to grasp the valve so that it can also perform the turning motion. For walking, the robot needs to know where it can or cannot step, while still allowing the body to move to balance for the next step. When climbing, the robot needs to know what it can grasp, step on, or support against. To generate the motion specifications, a behavior planner can be utilized. The input to the behavior planner is a behavior specification, which consists of a behavior type, and the input parameters specific to that behavior. For example, a "grasp-and-rotate" behavior is specified by a position and orientation in which to grasp an object, an axis of rotation, and the amount to rotate. This can then be used for tasks such as opening a door handle, opening the door, or turning a valve.

The output of the behavior planner is a ranked set of fully specified behaviors, which include the desired body pose of the robot, the joint angles of the limbs required for the behavior, and other parameters, such as the expected force on the end-effector, and what controllers and checks to run (e.g. force control in the end-effector z-axis during a certain motion). Behavior planning can be broken up into manipulation behaviors and mobility behaviors. For manipulation planning, the goal is to determine the best end-effector pose and starting joint angles of a limb to perform a certain behavior. For grasping, the operator can specify a desired end-effector orientation, an orientation with mirroring along an axis, or a palm normal. The behavior planner then searches over the possible orientations, discretizing the search when necessary (e.g. over yaw around the palm normal). The behavior planner can optionally also perturb the pose if no solutions are found at the specified poses.

For each pose, the behavior planner first determines if there is an IK solution for the desired pose. Then for each IK solution for the pose, the behavior planner forward propagates the expected behavior motion and verifies that a continuous IK solution (i.e. no configuration changes) exists for the entire behavior. The cost of each solution is the length of completion, or for motions that complete enough of the behavior, the cumulative joint angle distance from the current joint angles to the solution. The motion planner is then called to test feasibility of achieving the start position of the behavior, in order of lowest cost solutions, exiting after the first feasible solution. For mobility behaviors, such as walking, climbing, or shifting the body, the behavior planner is responsible for producing a set of body and end-effector poses, and an IK reference posture, which is then fed to the motion planner.

In several embodiments, the robot can use perception data to autonomously compute a path of body poses through the terrain. In time-constrained applications, the operator can navigate the terrain by providing a delta goal position and orientation to the robot. Typically when walking, these delta motions can be 1-2 meters long. Using the desired goal pose, the behavior planner can then interpolate from a current robot pose to a desired pose, placing nominal limb holds for each limb in succession over the body motions. The effective step length could be regulated by changing the body delta (in position and orientation) used to place a new limb hold. In practice, the planner can adaptively select the step length by starting with the longest distance and then reducing it when no solutions are found by the motion planner. When walking or climbing, the behavior planner can initially select a nominal limb hold based on the expected body pose. This can be independent of any terrain knowledge, and so can be used for completely blind, reactive motions. However, when terrain knowledge is available, either generated from vision data, or supplied by a user model, the behavior planner can automatically select holds by searching around the nominal hold. When a grid map is available, the planner can search a local neighborhood in the map for feasible holds, and return a best hold. When a model is provided by the operator, or when holds are specified directly by the operator, holds can be indexed into a K-dimensional tree and a nearest neighbor search used to find feasible holds within a fixed distance of the nominal hold. Holds can be classified as weight holds, which are flat z-normal weight bearing holds (e.g. the ground), balance holds, which are flat but not z-normal weight bearing (e.g. a wall), or grasp holds, which can be grasped (e.g. a railing). The IK reference posture can bias the motion planner to choose solutions that minimize the distance to a set of reference joint angles. This allows the robot to "walk" in different ways for the same set of limb holds. For example, with a reference posture of the limbs pointing down under the chassis, and a free pitch joint, the robot will tend to walk using its pitch joints, similar to a horse or dog. But for a reference posture with the limbs pointing out from the chassis, and a free yaw joint, the robot will tend to walk using its yaw joints, similar to a spider. The behavior planner can change the reference posture at any time, and the planner will naturally migrate to that solution as it moves. This is useful for transitioning between a low sprawled walk, which is more stable and kinematically feasible on very rough terrain, and walking tall, narrow, and upright, which is useful for walking through narrow openings or up stairs.

Although various behavior planning processes are described above, any of a variety of behavior planning processes can be utilized to plan motion and manipulations by a robotics platform as appropriate to the requirements of specific applications in accordance with embodiments of the invention. Processes for executing planned motions using a robotics platform in accordance with many embodiments of the invention are discussed further below.

11. Motion Execution System

In many embodiments, the on-board robotic motion execution system implements a control and behavior process. Behaviors are represented by an asynchronous hierarchical state machine, which defines task frame control specifications and monitors execution of the synchronous fixed-rate control loop. The control process is responsible for achieving specified task frame goals and inverting the desired motions into joint space trajectories, which are executed on each limb's distributed motor controllers.

The motion execution system can define desired task frame motions and feedback set-points for each limb. The behavior asynchronous state machine can translate these high level requirements (such as moving a limb into contact) into motions (task frame positions and motions) and set-points (desired end-effector force). The behavior can be executed as a finite state machine, for instance first moving along a velocity vector, then detecting contact, and then achieving a desired force set-point. Each behavior can also provide abstraction for the planning engine, translating the state machine into an efficiently searched kinematic representation for verification of reachability, balance, and force limit checking. The behavior state machine architecture is disclosed in Nicolas Hudson et al. *Model-based autonomous system for performing dexterous, human-level manipulation tasks,* 36.1-2 Autonomous Robots 31 (2014), the relevant disclosure from which is hereby incorporated by reference in its entirety.

The following definitions and concepts can be useful in describing the execution of behaviors by a robot. An action can be defined as a single finite state of a behavior and defines the current control goals, for instance moving the end-effector around a valve axis, and tracking a desired torque about the axis. Specifications are not required to be in orthogonal axes, and may compete for desired end-effector motions. An action can also have a set of end conditions that dictate when an action is complete or when an error has occurred. An action can involve monitoring both extrinsic signals, such as (but not limited to) increases in valve rotation torque, indicating reaching the end of a valve handle's travel, or internal fault state, such as reaching kinematic constraints. A behavior is implicitly a hybrid automaton, where the control goals define the continuous motion of the system, and the guarded transitions between states are defined by the end-conditions and transitions of the finite state machine. A behavior encapsulates the idea of automatic fault recovery: the behavior state machine is programmed to differentiate between conditions that are recoverable, with a predefined recovery sequence, or conditions that require halting the execution sequence.

To exploit operator involvement in the system, and to simplify the development and testing of behaviors, implementations of the RoboSimian robotics platform can utilize the sending of behavior sequences to the robot. A behavior sequence is simply a sequential script of behaviors, with transitions between behaviors constrained to the sequence, or exiting on a single behavior failure. The on-board execution system can be agnostic to the use of a behavior compared to a behavior sequence; for instance, a complicated grasp-rotate-release behavior could be created, which would execute exactly as a sequence of a grasp behavior, a rotate behavior, and a release behavior sequence. The use of sophisticated hierarchical behaviors can be important in applications involving completely autonomous execution of behaviors.

Behaviors can have well defined and logical transitions between states to facilitate automated fault recovery. However, given the ability and desire to have a human user monitor the robotic execution in many applications, it can be safer and easier to test a set of simple behaviors with simple fault conditions, and to rely on the operator to create and reorganize a behavior sequence. This also has the advantage that the human can step though each behavior or send novel sequences to the robot in the event of unexpected situations.

In a number of embodiments, actions are translated into Generalized Compliant Motion (GCM) controllers described Nicolas Hudson et al. *Model-based autonomous system for performing dexterous, human-level manipulation tasks,* 36.1-2 Autonomous Robots 31 (2014), the relevant disclosure from which is hereby incorporated by reference in its entirety. GCM translates competing control objectives into end-effector position trajectories or velocity set-points by representing control goals as linear second order systems in the task frame and superimposing them. GCM has the significant advantage of making specifying behaviors simple, allowing arbitrary frames and competing control objectives to be specified, with relative importance being represented by the stiffness of the representative second order system. In many applications, a small set of task frame control objectives: force, Cartesian trajectory tracking, visual servoing (minimizing visual tracking goal errors), dithering (random searching motions, such as wiggling a key), kinematic constraint satisfaction can be sufficient to execute all tasks. The GCM fusion of control objectives in the task frame can produce a continuous desired end-effector motion. This is then translated into desired joint space motions through numerical inverse kinematics. GCM controllers and numerical IK can be run at 250 Hz in a soft real time loop to produce desired joint position and velocity set-points. A separate process for each limb can interpolate these set-points at 1 kHz and send position goals to each motor controller over EtherCAT. The distributed Elmo motor controllers utilized in the description of an implementation of the RoboSimian limbs provided above can track joint positions at 10 kHz in hard-real time. The 10 kHz PID controllers produced high bandwidth joint tracking, and the 100:1 motor gear ratios create a stiff and precise limb, which requires all task frame controllers to produce smooth joint trajectories. No feedforward control or intrinsic limb compliance are necessary to achieve control objectives. Both of these later approaches have been shown to be advantageous in other robotics applications, but the high control bandwidth available in the RoboSimian robotics platform can enable adequate task frame compliance using sensed force feedback. This end-effector compliance was utilized for robust walking over uncertain terrain. By simply specifying desired contact forces for behaviors, executed every step touchdown, the open loop planners are able to walk blindly over uneven terrain.

Although specific motion execution processes are described above, any of a variety of motion execution processes can be utilized in robotics platforms as appropriate to the requirements of specific applications in accordance with embodiments of the invention. Specific processes that utilize IK lookup tables in motion planning are discussed further below.

12. Use of IK Lookup Tables in Motion Planning

Traditionally, kinematic redundancies have been avoided in robot leg designs because of their inherent increased mechanical and planning complexity without clear benefits for walking. In contrast, redundant kinematics are favored for manipulation because of increased dexterity. Because RoboSimian uses the same kinematically redundant limbs for mobility and manipulation, effective strategies for choosing inverse kinematics (IK) solutions and planning walking motions are key to improving RoboSimian's ability to traverse rough terrain.

In several embodiments, the use of an IK lookup table designed to give unique solutions with smooth joint trajectories for any end-effector trajectory in the (potentially truncated) workspace can be utilized in motion planning. The IK table can be used on all limbs at all times to create effectively non-redundant limbs, but at the cost of a great deal of capability. Alternatively, the IK table can be used at limited times, and at other times allow for arbitrary motions in joint space on certain limbs.

In a number of embodiments, an IK table is used to determine the positions of all four limbs at the beginning and end of a step or body shift motion. Uniquely determining the end pose allows the use of planning algorithms such as RRT Connect, and the proper design of the IK table ensures that the choice is appropriate. During these motions, one limb (known as the dominant limb) is allowed to move arbitrarily in jointspace. The forward kinematics of the dominant limb determines the position of the body relative to the world. When there is a swing limb, it is also allowed to move arbitrarily in joint space during the motion (the dominant and swing limbs can be considered to be one serial mechanism). Achieving kinematic closure of the remaining non-dominant and non-swing (dependent) limbs is accomplished by using IK table solutions for those limbs between the body pose (which is determined by the dominant limb) and the footholds for the dependent limbs. An example of this process is illustrated in FIGS. 9A-9D. The pose of the robot body 250 is shown in FIG. 9A upon planting of the dominant limb 252. The swing limb 254 is allowed to move arbitrarily in joint space to avoid the obstacle 256. The movement of the swing leg 254 and its placement 258 is illustrated sequentially in FIGS. 9A-9D. During the motion, the non-dominant and non-swing (dependent limbs) 290 are moved to achieve the desired body 250 pose determined by the dominant limb 252 using IK table solutions. Use of IK lookup tables in this manner can improve the mobility performance of the RoboSimian robotics platform in terms of speed and tolerance for difficult terrain.

Although the use of IK lookup tables is described above as a technique for improving the mobility performance of a robot, any of a variety of techniques for planning motion for high degree of freedom limbs can be utilized in the motion planning of one or more limbs of a robot constructed in accordance with an embodiment of the invention. As noted above, robot motion can be triggered based upon parameterized behavior plans provided by operators. Remote modules utilized in the control of robots constructed in accordance with various embodiments of the invention are discussed further below.

12. Remote Modules

The software architecture of the RoboSimian robotics platform includes a remote module that has the primary purpose of enabling operator control of the robot and the model of the world. A remote interface can be used for configuring the robot "end-state" and requesting a plan solution to move all the limbs and joints to properly end in that configuration via simple key-presses and mouse clicks. The remote interface can also be used to insert known models of objects (e.g. valves, ladders, hoses, etc.) into the world manually so that the robot can interact with objects for manipulation.

In bandwidth constrained applications, real-time teleoperation of the robot may not be possible. As such, semi-autonomous behaviors can be developed that allow the operator to specify any chained sequence of behaviors to follow. If a collision-free plan existed to execute the entire sequence, the robot can execute the motion from the beginning behavior to the end. Complicated sequences of behaviors can be scripted into single actions that can be called by the operator with a single button press (e.g. "rotate-valve", "insert-hose", "push-open-door"), depending on the task.

In embodiments in which the plan module executes on the robot high-brain computing stack and not the same machine as the remote module, only plan "previews" are sent back to the user to inspect and verify the intended plan motion. In this way, the robot can be configured so that the robot only proceeds to execute the entire plan upon operator verification of the "preview" plan.

To establish a sense of scene-understanding and situational awareness, the 3D voxel map used in the perception process along with the stereo images can be sent to the remote module interface. To optimize the amount of data sent over a limited bandwidth connection, only voxel deltas can be sent when delivering map data and compressed images can be sent when delivering imagery. Additionally, because the objects with which an operator intends the robot to interact are often well known and modeled, a graphical object model can be overlaid by the operator on an image captured by the robot's vision system. This feature combined with the 3D voxel map afford an operator with the capability to accurately fit objects into the world before interacting with them.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A manipulator, comprising:
an azimuth actuator;
a plurality of rigid L shaped elbow joints, each rigid L shaped elbow joint includes a first L shaped elbow joint actuator and a second L shaped elbow joint actuator, where the axis of rotation of the first L shaped elbow joint actuator is perpendicular to the axis of rotation of the second L shaped elbow joint actuator to allow greater than 360 degree rotation;
a first rigid L shaped connecting structure that connects the azimuth actuator and a first rigid L shaped elbow joint in the plurality of rigid L shaped elbow joints;
a second rigid L shaped connecting structure that connects the first rigid L shaped elbow joint and a second rigid L shaped elbow joint in the plurality of rigid L shaped elbow joints;
a third rigid L shaped connecting structure that connects the second rigid L shaped elbow joint to a third rigid L shaped elbow joint in the plurality of rigid L shaped elbow joints; and
an end-effector interface connected to the third rigid L shaped elbow joint.

2. The manipulator of claim 1, wherein the same type of actuator is utilized to implement the actuators in each of the plurality of rigid L shaped elbow joints.

3. The manipulator of claim 2, wherein the actuator comprises a motor including a power-on-to-disengage safety brake.

4. The manipulator of claim 1, wherein each joint comprises at least one position sensor.

5. The manipulator of claim 4, wherein the at least one position sensor comprises an optical incremental encoder on a motor rotor or a capacitive absolute position sensor on an actuator output.

6. The manipulator of claim 1, wherein each joint includes a motherboard including connectors enabling daisy-chaining of power and communication harnessing.

7. The manipulator of claim 1, wherein the plurality of rigid L shaped elbow joints have the same dimensions and construction.

8. The manipulator of claim 1, wherein the end-effector interface includes a six axis force and torque sensor.

9. The manipulator of claim 1, further comprising a hand assembly connected to the end-effector interface.

10. The manipulator of claim 9, wherein the hand assembly comprises a camera.

11. The manipulator of claim 1, further comprising a cam hand assembly connected to the end-effector interface, wherein the cam hand assembly comprises two pairs of opposing curved fingers, the first pair of opposing curved fingers comprising a first curved finger and a second curved finger configured to continuously rotate around a common cam hand axis perpendicular to the first curved finger and the second curved finger, the second pair of opposing curved fingers comprising a third curved finger and a fourth curved finger configured to continuously rotate around the common cam hand axis perpendicular to the third curved finger and the fourth curved finger.

12. The manipulator of claim 11, wherein each curved finger is a unitary piece comprising a convex edge and a concave edge that converge to form a point at a tip of each curved finger.

13. The manipulator of claim 12, wherein:
the first curved finger in the first pair of opposing curved fingers form a slave pair; and
the second curved finger in the first pair of opposing curved fingers is configured to move independently of the first curved finger.

14. The manipulator of claim 12, wherein the cam hand assembly controls poses for the first, second, third, and fourth curved fingers.

15. The manipulator of claim 12, wherein the cam hand assembly in the first pair of opposing curved fingers and the second pair of opposing curved fingers is configured to clasp an object using a standard opposed wrap in a manner that forms a wrist with effective 180 degrees of freedom.

16. The manipulator of claim 12, wherein the first pair of opposing curved fingers and the second pair of opposing curved fingers is configured to interface with an interior surface of a cylindrical object to provide a cam grasp.

17. The manipulator of claim 12, wherein the cam hand assembly wherein each curved finger is configured to move independently.

18. The manipulator of claim 12, wherein the convex edge of each curved finger is configured to grasp an object.

19. The manipulator of claim 12, wherein the concave edge of each curved finger is configured to grasp an object.

20. A manipulator, comprising:
an azimuth actuator;
a plurality of rigid L shaped elbow joints where each rigid L shaped elbow joint includes a first L shaped elbow joint actuator and a second L shaped elbow joint actuator, where the axis of rotation of the first L shaped elbow joint actuator is perpendicular to the axis of rotation of the second L shaped elbow joint actuator to allow greater than 360 degree rotation;
a first rigid L shaped connecting structure that connects the azimuth actuator and a first rigid L shaped elbow joint of the plurality of rigid L shaped elbow joints;
a second rigid L shaped connecting structure that connects the first rigid L shaped elbow joint and a second rigid L shaped elbow joint in the plurality of rigid L shaped elbow joints;
a third rigid L shaped connecting structure that connects the second rigid L shaped elbow joint to a third rigid L shaped elbow joint in the plurality of rigid L shaped elbow joints;
an end-effector interface connected to the third rigid L shaped elbow joint in the plurality of joints; and
a cam hand assembly connected to the end-effector interface, where the cam hand assembly comprises two pairs of opposing curved fingers, the first pair of opposing curved fingers comprising a first curved finger and a second curved finger configured to continuously rotate around a common cam hand axis perpendicular to the first curved finger and the second curved finger, the second pair of opposing curved fingers comprising a third curved finger and a fourth curved finger configured to continuously rotate around the common cam hand axis perpendicular to the third curved finger and the fourth curved finger;

wherein the plurality of rigid L shaped elbow joints have the same dimensions and construction;

wherein the same type of actuator is utilized to implement the first rigid L shaped elbow joint actuator and the second rigid L shaped elbow joint actuator for the first rigid L shaped elbow joint, the second rigid L shaped elbow joint, and the third rigid L shaped elbow joint, and the actuator comprises a motor including a power-on-to-disengage safety brake; and wherein the cam hand assembly is utilized to control poses for the plurality of fingers.

21. The manipulator of claim 20, wherein the cam hand assembly base comprises a camera.

* * * * *